United States Patent Office
3,488,352
Patented Jan. 6, 1970

3,488,352
BASICALLY SUBSTITUTED ALKOXY ANTHRANIL-
AMIDES, THEIR CORRESPONDING 2-NITRO
COMPOUNDS AND DERIVATIVES THEREOF
Edgar S. Schipper, Highland Park, and Paul Levitan, West
New York, N.J., assignors to Shulton, Inc., Clifton,
N.J., a corporation of New Jersey
No Drawing. Filed Oct. 11, 1966, Ser. No. 585,748
Int. Cl. C07d 51/70; A61k 25/00
U.S. Cl. 260—268                              32 Claims

ABSTRACT OF THE DISCLOSURE

Certain N-piperazino-o-nitro- and o-amino-anthranilamides are disclosed. The compounds are useful in antipsychotic applications and as sedatives and tranquilizers.

This invention relates to 2-amino and 2-nitro benzamides, and more particularly to basically substituted alkoxy anthranilamides, their corresponding 2-nitro compounds and the nontoxic salts of all such compounds.

The basically substituted alkoxy anthranilamides of this invention are new compounds having the following formula:

(1) 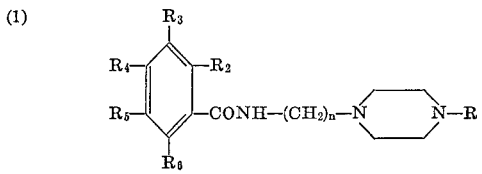

in which R is lower alkyl, phenyl or substituted phenyl in which the substituent is halogen, lower alkyl, lower alkoxy or trifluoromethyl; $R_2$ is nitro or amino; $R_3$, $R_4$, $R_5$ and $R_6$ are hydrogen, lower alkoxy or methylenedioxy, at least one of $R_3$, $R_4$, $R_5$, and $R_6$ being a lower alkoxy or connected to a methylenedioxy group; and $n$ is a whole number within the range of 2 through 4. The lower alkoxy and lower alkyl groups have less than 4 carbon atoms. The halogen of the substituted phenyl may be, for example, fluorine or chlorine. Either or both hydrogens of the amino group in the 2 position of the benzene nucleus may be substituted, for example, with lower alkyl or lower acyl.

The compounds of this invention manifest central nervous system depressant activity in many animals in dosages from 30 to 300 mg. per kg. of body weight. They possess antipsychotic characteristics. They are also useful as sedatives and transquilizers in the treatment of animals.

Compounds of this invention were screened in mice by the Irwin Screening Protocol in accordance with the procedure described in a paper presented at the Postgraduate Course on "Animal and Clinical Pharmacological Techniques in Drug Evaluation" at Hahnemann Medical College and Hospital of Philadelphia, Feb. 4–15, 1963, published by Year Book Medical Publishers, 1963. The results indicate the compounds are potent central nervous system depressants with neuro-pharmacological profiles resembling that of chlorpromazine.

The new compositions of this invention may be produced by reacting the corresponding 2-nitro substituted benzoyl chloride with the required amine in accordance with the following reaction:

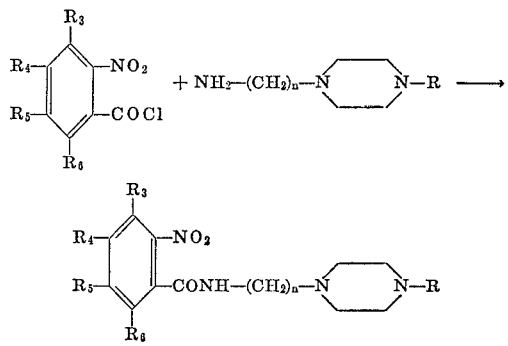

The basically substituted alkoxy anthranilamides are produced from the corresponding 2-nitro compound by catalytic reduction with a suitable catalyst, such as Raney nickel or palladium-on-carbon in accordance with the following reaction:

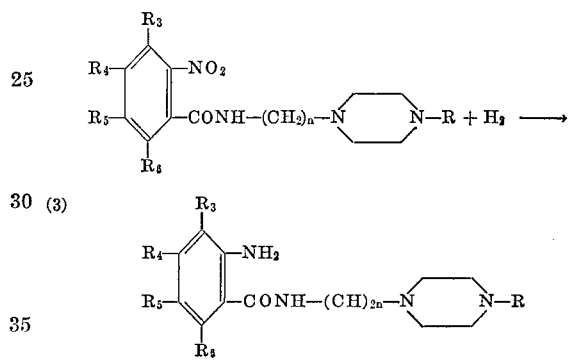

To produce the substituted alkoxy-2-nitro benzoyl chloride which is employed in the reaction for preparing the 2-nitro compound corresponding to the basically substituted alkoxy anthranilamides of this invention, a substituted alkoxy benzoic acid is first nitrated and the resulting 2-nitro compound is then reacted with thionyl chloride in accordance with the following reactions:

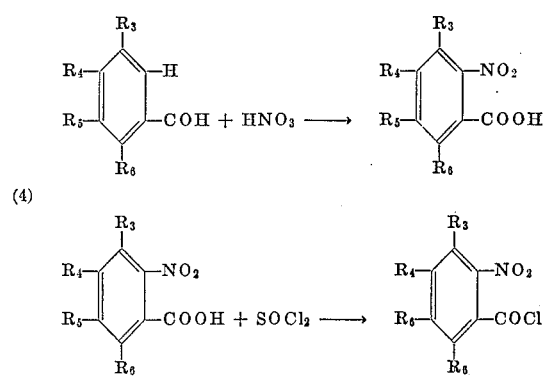

The required amine used as the other reactant to produce the 2-nitro compound corresponding to the basically substituted alkoxy anthranilamides is prepared by reacting a 1-substituted piperazine with a chloronitrile and anhydrous sodium carbonate in a suitable solvent such as isopropanol in accordance with the method of Shin Hayao and R. N. Schut J. Org. Chem. 24, 3414 (1961). The reaction is as follows:

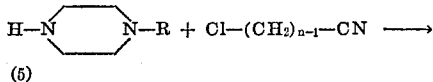

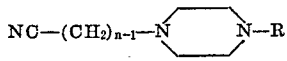

Alternatively, an unsaturated nitrile such as acrylonitrile may be employed instead of the chloronitrile. This alternative method is a modification of the procedure of C. B. Pollard, E. G. Rietz and R. Robbins, J. Am. Chem. Soc., 75, 2989 (1953).

The required amine is prepared from the cyano compound by reduction with lithium aluminum hydride in accordance with the following reaction:

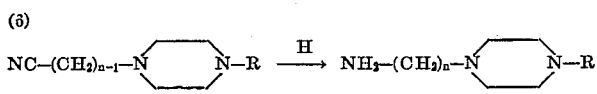

Mono-, di- and tri- non-toxic acid addition salts of the basically substituted alkoxy anthranilamides and mono- and di- non-toxic acid addition salts of the corresponding nitro compounds of such anthranilamides are produced by mixing stoichiometric amounts of the required anthranilamide or its corresponding 2-nitro compound and the required acid in an inert solvent such as ether, ethanol, benzene or toluene, and subsequently filtering the precipitated salt or evaporating the solvent and recovering the solid residue. Salts of inorganic acids such as hydrochloric, sulfuric or phosphoric acid or salts of organic acids, such as acetic, succinic, tartaric or citric acid of the basically substituted alkoxy anthranilamides or their corresponding 2-nitro compounds may be produced in this manner.

Conveniently, the compounds of this invention, such as the basically substituted alkoxy anthranilamides of Examples I thru XXXIII are associated with solid or liquid pharmaceutically acceptable carriers for oral or parenteral administration in the treatment of behavior disturbances in animals. The compounds and carriers may be in the form of capsules, tablets, powders, sterile solutions of water or other pharmaceutically acceptable solvent or other dosage forms. The compounds may be admixed with diluents and adjuvents, such as lactose, gums, stearic acid or talc.

A more comprehensive understanding of this invention is obtained by reference to the following examples:

EXAMPLE I 2-amino-4,5-dimethoxy-N-[2-(4-phenyl-1-piperazinyl) ethyl]benzamide (A) 1 - phenyl - 4-cyanomethyl-piperazine.—This compound was prepared according to the method of Shin Hayao and R. N. Schut, J. Org. Chem., 24, 3414 (1961) by refluxing for 20 hours a stirred mixture of 1-phenylpiperazine (24.3 g., 0.15 mole), chloroacetonitrile (11.3 g., 0.15 mole) and anhydrous sodium carbonate (15.9 g., 0.15 mole) in isopropanol (75 ml.). The inorganic salt was filtered while hot and the filtrate was evaporated to give 21.5 g. (71.2% yield) of the crude nitrile which was used in the subsequent reduction without further purification.

(B) 1-phenyl-4-(2-aminoethyl)piperazine.—The above nitrile (20.1 g., 0.10 mole) was dissolved in ether (400 ml.) filtered and added dropwise to a stirred suspension of lithium aluminum hydride (3.8 g., 0.10 mole) in ether (100 ml.). The mixture was refluxed 3 hours and decomposed by adding in succession 4 ml. of water, 3 ml. of 20% sodium hydroxide solution and 14 ml. of water. After filtration, the ether was evaporated under reduced pressure and the crude amine was distilled through a short-path column to give 18.0 g. (87.8% yield) of light amber colored liquid, B.P. 165–170° C. (0.2 mm.). On standing the amine crystallized as a colorless solid, M.P. 55–58° C.

(C) 2-nitro-4,5-dimethoxy benzoic acid.—A suspension of 3,4-dimethoxy benzoic acid (300 g., 1.66 mole) in glacial acetic acid (775 ml.) was stirred with cooling to maintain a temperature of 10 to 15° C. while a solution of glacial acetic acid (775 ml.) and 90% nitric acid (1550 ml., 33 moles) was added dropwise over a 90-minute period. Stirring was continued at 0–5° C. for 3 hours, the acid mixture was poured onto 9 kg. of cracked ice and the precipitate was filtered after the ice had melted. The filter cake was dissolved in 3 l. of 10% sodium bicarbonate solution, reprecipitated with dilute hydrochloric acid, filtered, and air dried to give 243 g. (64.5% yield) of yellow needles, M.P. 191–193° C.

(D) 2-nitro-4,5-dimethoxy benzoyl chloride.—Thionyl chloride (31.3 g., 0.26 mole) was added dropwise to a stirred suspension of the above acid (60 g., 0.26 mole) in dry benzene (425 ml.). The mixture was refluxed for 2 hours and then distilled to dryness under reduced pressure to give 62 g. (95.5% yield) of crude product.

(E) 2 - nitro - 4,5-dimethoxy-N-[2-(4-phenyl-1-piperazinyl) ethyl ]benzamide.—A suspension of the above crude acid chloride (7.4 g., 0.03 mole) in benzene (100 ml.) was added to a stirred solution of 1-phenyl-4-(2-aminoethyl) piperazine (6.2 g., 0.03 mole) and pyridine (6 ml.) in benzene (50 ml.) under a nitrogen atmosphere. The mixture was refluxed for 15 minutes, stirred for 16 hours at ambient temperature and evaporated to dryness under reduced pressure. The residue was dissolved in methylene chloride (500 ml.) and the solution was extracted successively with 50% sodium hydroxide solution (50 ml.) and water. The methylene chloride solution was dried over sodium sulfate, filtered, and evaporated to dryness under reduced pressure. The residue was recrystallized twice from a mixture of isopropanol and hexane to give 6.1 g. (49.1% yield) of double melting yellow needles, M.P. 75–78° C. and 137–138° C. The analytical sample was recrystallized from a mixture of ethyl acetate and hexane as yellow needles, M.P. 135–136° C.

Analysis.—Calcd. for $C_{21}H_{26}N_4O_5$: C, 60.85; H, 6.32; N, 13.52. Found: C, 60.90; H, 6.43; N, 13.61.

(F) 2-amino-4,5-dimethoxy-N-[2 - (4-phenyl-1-piperazinyl)ethyl]benzamide.—A solution of the above nitrobenzamide (3.0 g., 0.007 mole) in ethyl acetate (100 ml.) and isopropanol (50 ml.) was catalytically reduced over 5% palladium-on-carbon (0.5 g.) under 3 atmospheres of hydrogen. After 3 hours the catalyst was filtered off and the filtrate was evaporated to dryness under reduced pressure. The residue was triturated with pentane and filtered to give 2.3 g. (82.6% yield) of colorless needles, M.P. 136–138° C. The analytical sample was recrystallized from ethyl acetate as colorless needles, M.P. 138—139° C.

Analysis.—Calcd. for $C_{21}H_{28}N_4O_3$: C, 65.60; H, 7.34; N, 14.57. Found: C, 65.40; H, 7.52; N, 14.43.

EXAMPLE II 2-amino-4,5-dimethoxy-N-[3-(4-phenyl-1-piperazinyl) propyl]benzamide (A) 1-phenyl-4(2-cyanoethyl) piperazine.—This compound was prepared by a modification of the method of C. B. Pollard, E. G. Rietz and R. Robbins, J. Am. Chem. Soc., 75, 2989 (1953) by heating on the steam bath for 20 hours a mixture of 1-phenylpiperazine (64.8 g., 0.40 mole) and acrylonitrile (23.4 g., 0.44 mole). The crystalline mass was recrystallized from isopropanol to give 74 g. (86.6% yield) of the crude nitrile which was used in the subsequent reduction without further purification.

(B) 1-phenyl-4-(3-aminopropyl) piperazine. — The above nitrile (64.7 g., 0.30 mole) was reduced with lithium aluminum hydride (11.4 g., 0.30 mole) in ether and distilled through a short-path column to give 50.0 g. (76.3% yield) of colorless liquid, B.P. 155–160° C. (0.3 mm.). On standing the amine crystallized as a colorless solid, M.P. 37–40° C.

(C) 2 - nitro - 4,5 - dimethoxy - N - [3 - (4 - phenyl-1-piperazinyl) propyl]benzamide.—A solution of 2-nitro-4,5-dimethoxy benzoyl chloride (7.4 g., 0.03 mole) in benzene (125 ml.) was added dropwise to an ice cold stirred mixture of 1-phenyl-4-(3-aminopropyl) piperazine (6.6 g., 0.03 mole), benzene (6 ml.) and 20% sodium hydroxide solution (9.4 ml.) under a nitrogen atmosphere. After stirring at ambient temperature for 18 hours, the solid product was filtered, dried and recrystallized from isopropanol to give 9.7 g. (75.2% yield) of yellow needles, M.P. 163–164° C. The analytical sample was recrystallized from 95% ethanol as yellow needles, M.P. 164–166° C.

Analysis.—Calcd. for $C_{22}H_{28}N_4O_5$: C, 61.67; H, 6.59; N, 13.08. Found: C, 61.18; H, 6.47; N, 13.19.

(D) 2 - amino - 4,5 - dimethoxy - N - [3 - (4 - phenyl-1-piperazinyl) propyl]benzamide.—A solution of the above nitrobenzamide (2.14 g., 0.005 mole) in warm ethyl acetate (200 ml.) was catalytically reduced over 5% palladium-on-carbon (0.5 g.) or Raney nickel (2.0 g.) under 3 atmospheres of hydrogen. The catalyst was filtered off and the filtrate was cooled to give 1.45 g. (72.9% yield) of colorless needles, M.P. 175–176° C.

Analysis.—Calcd. for $C_{22}H_{30}N_4O_3$: C, 66.31; H, 7.59; N, 14.06. Found: C, 66.09; H, 7.54; N, 14.30.

(E) 2 - amino - 4,5 - dimethoxy - N - [3 - (4 - phenyl-1-piperazinyl) propyl]benzamide monohydrochloride.—Hydrochloric acid (9.44 ml. of 0.5315 N solution, 0.0050 mole) was added dropwise with stirring to a hot solution of the above free base (1.99 g., 0.0050 mole) in absolute ethanol (250 ml.). Hexane (250 ml.) was added and the solution was cooled at −20° C. The product crystallized very slowly to give 2.03 g. (92.3% yield) of pale pink needles, M.P. 241–243° C.

Analysis.—Calcd. for $C_{22}H_{31}ClN_4O_3$: C, 60.75; H, 7.18; Cl, 8.15; N, 12.88. Found: C, 60.83; H, 7.23; Cl, 8.28; N, 12.81.

(F) 2 - amino - 4,5 - dimethoxy - N - [3 - (4 - phenyl-1-piperazinyl) propyl]benzamide dihydrochloride.—Hydrochloric acid (18,88 ml. of 0.531 N solution, 0.0100 mole) was added dropwise with stirring to a hot solution of the above free base (1.99 g., 0.0050 mole) in absolute ethanol (250 ml.). Pentane (150 ml.) was added and the solution was cooled at −20° C. The product crystallized very slowly to give 1.75 g. (74.1% yield) of colorless needles, M.P. 235–239° C.

Analysis.—Calcd. for $C_{22}H_{32}Cl_2N_4O_3$: C, 56.05; H, 6.84; Cl, 15.04; N, 11.89. Found: C, 56.04; H, 7.02; Cl, 14.91; N, 11.85.

(G) 2 - amino - 4,5 - dimethoxy - N - [3 - (4-phenyl-1-piperazinyl) propyl]benzamide trihydrochloride.—Hydrochloric acid (28.32 ml. of 0.5315 N solution, 0.0100 mole) was added dropwise with stirring to a hot solution of the above free base (1.99 g., 0.0050 mole) in absolute ethanol (250 ml.). The solution was cooled at −20° C. and the product crystallized very slowly to give 2.3 g. (92% yield) of colorless needles, M.P. 230–235° C.

Analysis.—Calcd. for $C_{22}H_{33}Cl_3N_4O_3$: C, 52.02; H, 6.55; Cl, 20.94; N, 11.03. Found: C, 52.08; H, 6.64; Cl, 20.62; N, 10.91.

EXAMPLE III 2-amino-4,5-dimethoxy-N-[4,4-phenyl-1-piperazinyl) butyl]benzamide (A) 1-phenyl-4-(3-cyanopropyl) piperazine. — This compound was prepared according to the method of Shin Hayao and R. N. Schut, loc. cit., by refluxing for 20 hours a stirred mixture of 1-phenylpiperazine (43.8 g., 0.27 mole), 4-chlorobutyronitrile (28.1 g., 0.27 mole) and anhydrous sodium carbonate (28.7 g. 0.27 mole) in isopropanol (125 ml.). The inorganic salt was filtered while hot and the filtrate was evaporated under reduced pressure to give 60.8 g. (98.5% yield) of crude liquid nitrile.

(B) 1-phenyl-4-(4-aminobutyl) piperazine.—The above nitrile (60.8 g., 0.27 mole) was reduced with lithium aluminum hydride (10.4 g., 0.27 mole) in ether and distilled through a short-path column to give 41.5 g. (67.3% yield) of pale yellow liquid, B.P. 149–151° C. (0.1 mm.).

(C) 2 - nitro - 4,5 - dimethoxy - N - [4 - (4 - phenyl-1-piperazinyl) butyl]benzamide.—A mixture of 1-phenyl-4-(4-aminobutyl) piperazine (7.0 g., 0.03 mole), 2-nitro-4,5-dimethoxybenzoyl chloride (7.04 g., 0.03 mole), pyridine (5 ml.) and benzene (18 ml.) was refluxed 1 hour and allowed to stir 18 hours under a nitrogen atmosphere. The yellow solid which separated was filtered and recrystallized from a mixture of 30% aqueous sodium hydroxide solution (15 ml.) and isopropanol (200 ml.). The hot supernatant isopropanol solution was decanted and cooled to give a yellow solid which was recrystallized from a benzene and hexane mixture to give 6.2 g. (46.6% yield) of double melting pale yellow needles, M.P. 81–83° C. and 112–114° C.

Analysis.—Calcd. for $C_{23}H_{30}N_4O_5$: C, 62.42; H, 6.83; N, 12.66. Found: C, 62.39; H, 6.59; N, 12.56.

(D) 2 - amino - 4,5 - dimethoxy - N - [4 - (4 - phenyl-1-piperazinyl) butyl]benzamide. — A solution of the above nitrobenzamide (3.5 g., 0.008 mole) in ethyl acetate (250 ml.) was catalytically reduced over 5% palladium-on-carbon (0.5 g.) under 3 atmospheres of hydrogen. The catalyst was filtered off and the filtrate was reduced in vacuo to a small volume from which the product crystallized.

EXAMPLE IV 2-amino-4,5-dimethoxy-N-[3-[4-(o-tolyl)-1-piperazinyl] propyl]benzamide (A) 1-(o-tolyl)-4-(2-cyanoethyl) piperazine. — This compound was prepared by a modification of the method of C. B. Pollard, E. G. Rietz, and R. Robbins, loc. cit., by heating on the steam bath for 20 hours a mixture of 1-(o-tolyl) piperazine (35 g., 0.20 mole) and acrylonitrile (12.7 g. of 0.24 mole). The crystalline reaction mass was recrystallized from 95% ethanol to give 28.0 g. (61.5% yield) of colorless crystals, M.P. 79–80° C.

(B) 1-(o-tolyl)-4-(3 - aminopropyl) piperazine.—The above nitrile (14 g., 0.06 mole) was reduced with lithium aluminum hydride (2.85 g., 0.075 mole) and distilled through a short-path column to give 4.4 g. (30.8% yield) of colorless liquid, B.P. 154–157° C. (0.2 mm.). The dihydrochloride was prepared by adding dry hydrogen chloride to a solution of the amine in ether and recrystallizing the filter-cake from ethanol to give a white solid, M.P. 253° C. decomposition.

Analysis.—Calcd. for $C_{14}H_{25}N_3Cl_2$: C, 54.91; H, 8.22; N, 13.72. Found: C, 54.87; H. 8.08; N, 13.36.

(C) 2 - nitro-4,5-dimethoxy-N-[3-[4-(o-tolyl)-1-piperazinyl]propyl]benzamide.—A solution of 2-nitro-4,5-dimethoxybenzoyl chloride (15.0 g., 0.065 mole) in benzene (600 ml.) was added dropwise to an ice cold stirred mixture of 1-(o-tolyl)-4-(3-aminopropyl)piperazine (14.5 g., 0.062 mole) in benzene (12.4 ml.) and 20% sodium hydroxide solution (19.4 ml.) under a nitrogen atmosphere. After stirring at ambient temperature for 18 hours, the benzene layer was separated and evaporated to dryness under reduced pressure. The residue was recrystallized from isopropanol to give 10.6 g. (38.6% yield) of yellow crystals, M.P. 120–122° C. The analytical sample was recrystallized three times from isopropanol to give yellow needles, M.P. 123–124° C.

Analysis.—Calcd. for $C_{23}H_{30}N_4O_5$: C, 62.41; H, 6.84; N, 12.67. Found: C, 62.65; H, 6.87; N, 12.67.

(D) 2 - amino-4,5-dimethoxy - N - [3-[4-(o-tolyl)-1-piperazinyl]propyl]benzamide.—A solution of the above nitrobenzamide (2.1 g., 0.005 mole) in absolute ethanol (250 ml.) was catalytically reduced over 10% palladium-on-carbon under 3 atmospheres of hydrogen. The catalyst was filtered off, the filtrate was evaporated to dryness under reduced pressure and the residue was recrystallized from ethyl acetate to give 1.0 g. (51% yield) of colorless needles, M.P. 128–130° C.

*Analysis.*—Calcd. for $C_{23}H_{32}N_4O_3$: C, 66.96; H, 7.82; N, 13.58. Found: C, 66.92; H, 7.99; N, 13.86.

EXAMPLE V 2-amino-4,5-dimethoxy-N-[3-[4-(m-tolyl)-1-piperazinyl]propyl]benzamide (A) 1 - (m-tolyl)-4-(2-cyanoethyl) piperazine.—This compound was prepared by a modification of the method of C. B. Pollard, E. G. Rietz and R. Robbins, loc. cit., by heating on the steam bath for 20 hours a mixture of 1-(m-tolyl) piperazine (16.5 g., 0.094 mole) and acrylonitrile (6.0 g., 0.11 mole). The reaction mass was dissolved in ether, filtered to remove a solid impurity and evaporated in vacuo to give 16 g. (74.5% yield) of crude liquid nitrile.

(B) 1-(m-tolyl)-4-(3-aminopropyl) piperazine.—The above nitrile (14.7 g., 0.064 mole) was reduced The above nitrile (14.7 g., 0.064 mole) was reduced with lithium aluminum hydride (3.0 g., 0.08 mole) in ether and distilled through a short-path column to give 4.2 g. (28% yield) of colorless liquid, B.P. 157–166° C. (0.2 mm.).

*Analysis.*—Calcd. for $C_{14}H_{23}N_3$: C, 72.06; H, 9.93; N, 18.01. Found: C, 71.98; H, 9.89; N, 18.39.

(C) 2-nitro-4,5-dimethoxy-N-[3-[4 - (m-tolyl)-1-piperazinyl]propyl]benzamide.—A solution of 2-nitro-4,5-dimethoxybenzoyl chloride (4.8 g., 0.020 mole) in benzene (150 ml.) was added dropwise to a stirred solution of 1-(m-tolyl)-4-(3-aminopropyl) piperazine (4.2 g., 0.018 mole) in benzene (70 ml.). After 20 hours the mixture was made basic with 10% sodium hydroxide solution, the two layers were separated and the aqueous layer was extracted with methylene chloride. The combined organic extracts were dried over magnesium sulfate, filtered and evaporated to dryness under reduced pressure. The residue was recrystallized twice from an ethyl acetate and hexane mixture to give 3.0 g. (37.8% yield) of yellow needles, M.P. 133–135° C. The analytical sample was recrystallized from isopropanol as yellow needles, M.P. 138–139° C.

*Analysis*:—Calcd. for $C_{23}H_{30}N_4O_5$: C, 62.41; H, 6.84; N, 12.67 Found: C, 62.40; H, 7.07; N, 12.60.

(D) 2 - amino-4,5 - dimethoxy - N - [3-[4-(m-tolyl)-1-piperazinyl]propyl]benzamide.—A solution of the above nitrobenzamide (2.7 g., 0.006 mole) in absolute ethanol (250 ml.) was catalytically reduced over 10% palladium-on-carbon under 3 atmospheres of hydrogen. The catalyst was filtered off, the filtrate was evaporated to dryness under reduced pressure and the residue was recrystallized from ethyl acetate to give 1.9 g. (76% yield) of colorless needles, M.P. 122–124° C. The analytical sample was recrystallized from ethyl acetate, M.P. 128–131° C.

*Analysis.*—Calcd. for $C_{23}H_{32}H_4O_3$: C, 66.96; H, 7.82; N, 13.58. Found: C, 67.29; H, 7.86; N, 13.79.

EXAMPLE VI 2-amino-4,5-dimethoxy - N - [3-[4-(p-methoxyphenyl)-1-piperazinyl]propyl]benzamide (A) 1-(p-methoxyphenyl) - 4 - (2-cyanoethyl) piperazine.—This compound was prepared by a modification of the method of Shin Hayao and R. N. Schut, loc. cit., by heating on the steam bath for 20 hours a mixture of 1-(p-methoxyphenyl) piperazine (18.5 g., 0.097 mole) and acrylonitrile (6.3 g., 0.12 mole). The crystalline reaction mass was recrystallized from ethanol to give 20.0 g. (87.0% yield) of colorless crystals, M.P. 79–80° C.

(B) 1-(p-methoxyphenyl)-4-(3-aminopropyl) piperazine.—The above nitrile (18.0 g., 0.073 mole) was reduced with lithium aluminum hydride (3.8 g., 0.10 mole) in ether and distilled through a short-path column to give 11.7 g. (64% yield) of colorless liquid, B.P. 161–162° C. (0.1 mm.).

(C) 2 - nitro-4,5 - dimethoxy - N - [3-[4 - (p-methoxyphenyl)-1-piperazinyl]propyl]benzamide.—A solution of 2-nitro-4,5-dimethoxybenzoyl chloride (5.9 g., 0.024 mole) in benzene (100 ml.) was added to a stirred solution of 1-(p-methoxyphenyl)-4-(3-aminopropyl) piperazine (6.0 g., 0.024 mole) in methylene chloride (50 ml.). After 20 hours the mixture was made basic with 20% sodium hydroxide solution, the two layers were separated and the aqueous layer was extracted with methylene chloride. The combined organic extracts were dried over magnesium sulfate, filtered and evaporated to dryness under reduced pressure. The residue was recrystallized from ethyl acetate to give 3.0 g. (30% yield) of yellow needles, M.P. 185–186° C.

*Analysis.*—Calcd. for $C_{23}H_{30}N_4O_6$: C, 60.25; H, 6.60; N, 12.22. Found: C, 60.32; H, 6.71; N, 12.29.

(D) 2-amino-4,5-dimethoxy - N - [3-[4-(p-methoxyphenyl)-1-piperazinyl]propyl]benzamide.—A slurry of the above nitrobenzamide (2.3 g., 0.005 mole) in ethyl acetate (250 ml.) with catalytically reduced over Raney nickel (2 g.) under 3 atmospheres of hydrogen. The catalyst was filtered off and the filtrate was cooled to give 1.8 g. (83.8% yield) of colorless crystals, M.P. 152–153° C.

*Analysis.*—Calcd. for $C_{23}H_{32}N_4O_4$: C, 64.46; H, 7.53; N, 13.08. Found: C, 64.46; H, 7.67; N, 12.85.

EXAMPLE VII 2-amino-4,5-dimethoxy-N-[2-[4-(m-chlorophenyl)-1-piperazinyl]ethyl]benzamide (A) 1 - (m - chlorophenyl) - 4 - cyanomethyl-piperazine.—A mixture of 1 - (m - chlorophenyl) piperazine hydrochloride (23.3 g., 0.10 mole), chloroacetonitrile (7.6 g., 0.10 mole) and sodium carbonate (15.9 g., 0.15 mole) is isopropanol (75 ml.) was refluxed with stirring for 20 hours. The inorganic salt was filtered off while hot and the crude product crystallized on cooling. The crude material was recrystallized from isopropanol to give 21.0 g. (89.4% yield) of tan needles, M.P. 92–93° C. The analytical sample was twice recrystallized from a mixture of isopropanol and hexane as colorless needles, M.P. 92–93° C.

*Analysis.*—Calcd. for $C_{12}H_{14}ClN_3$: C, 61.14; H, 5.99; Cl, 15.04; N, 17.83. Found: C, 61.24; H, 5.83; Cl, 14.98; N, 18.16.

(B) 1 - (m - chlorophenyl) - 4 - (2 - aminoethyl) piperazine.—The above nitrile (11.8 g., 0.050 mole) was reduced with lithium aluminum hydride (1.9 g., 0.050 mole) in ether and distilled through a short-path column to give 10.0 g. (92.6% yield) of pale yellow liquid, B.P. 161–163° C. (0.05 mm.), $nD_4^{20}$ 1.5814.

*Analysis.*—Calcd. for $C_{12}H_{18}ClN$: C, 60.12; H, 7.57; Cl, 14.79; N, 17.53. Found: C, 60.18; H, 7.60; Cl, 14.59; N, 17.6.

(C) 2 - nitro - 4,5 - dimethoxy - N - [2-[4-(m-chlorophenyl) - 1 - piperazinyl]ethyl]benzamide.—A solution of 2-nitro-4,5-dimethoxydenzoyl chloride (6.13 g., 0.025 mole) in benzene (100 ml.) was added to a stirred solution of 1-(m-chlorophenyl) - 4 - (2-aminoethyl)piperazine (6.0 g., 0.025 mole), and pyridine (5 ml.) in benzene (50 ml.) under a nitrogen atmosphere. The mixture was refluxed briefly and stirred for 16 hours at ambient temperature. The yellow solid which separated was filtered, dissolved in methylene chloride (200 ml.) and the solution was extracted successively with 10% sodium hydroxide solution (50 ml.) and water (three 50 ml. portions). The methylene chloride solution was dried over sodium sulfate, filtered and evaporated to dryness under reduced pressure. The residue was recrystallized from isopropanol to give 5. g. (55.8% yield) of tan crystals, M.P. 93–95° C. The analytical sample was recrystallized from a mixture of isopropanol and hexane as yellow needles, M.P. 92–94° C.

*Analysis.*—Calcd. for $C_{21}H_{25}ClN_4O_5$: C, 56.18; H, 5.61; Cl, 7.90; N, 12.48. Found: C, 56.32; H, 5.71; Cl, 7.92; N, 12.30.

(D) 2 - amino - 4,5 - dimethoxy - N - [2-[4-(m-chlorophenyl)-1-piperazinyl]ethyl]benzamide.—A solution of the phenyl)-1-piperazinyl]ethyl]benzamide.—A solution of the above nitrobenzamide (2.25 g., 0.0050 mole) in warm ethyl acetate (200 ml.) was catalytically reduced over Raney nickel (2.0 g.) under 3 atmospheres of hydrogen. The catalyst was filtered off and the filtrate was evaporated under reduced pressure to give 1.6 g. (76.5% yield) of colorless needles, M.P. 139–140° C.

*Analysis.*—Calcd. for $C_{21}H_{27}ClN_4O_3$: C, 60.20; H, 6.50; Found: C, 60.23; H, 6.23.

EXAMPLE VIII 2-amino-4,5-dimethoxy-N-[3-[4-(o-chlorophenyl)-1-piperazinyl]propyl]benzamide (A) 1 - (o - chlorophenyl) - 4 - (2-cyanoethyl) piperazine.—This compound was prepared by a modification of the method of Shin Hayao and R. N. Schut, loc cit., by heating on the steam bath for 20 hours a mixture of 1-(o-chlorophenyl) piperazine (27.5 g., 0.14 mole) and acrylonitrile (9.0 g., 0.17 mole). The reaction mass was dissolved in ether, filtered and evaporated under reduced pressure to give 33.0 g. (94.5% yield) of the crude nitrile which was used in the subsequent reduction without further purification.

(B) 1 - (o - chlorophenyl) - 4 - (3 - aminopropyl) piperazine.—The above nitrile (30.2 g., 0.12 mole) was reduced with lithium aluminum hydride (5.7 g., 0.15 mole) in ether and distilled through a short-path column to give 11.1 g. (36% yield) of pale yellow liquid, B.P. 158–164° C. (0.3 mm.).

(C) 2 - nitro - 4,5 - dimethoxy - N - [3 - [4-(o-chlorophenyl) - 1 - piperazinyl]propyl]benzamide.—A solution of 2-nitro-4,5-dimethoxybenzoyl chloride (6.0 g., 0.024 mole) in benzene (150 ml.) was added to a stirred solution of 1-(o-chlorophenyl)-4-(3-aminopropyl) piperazine in benzene (100 ml.). The mixture was stirred for 18 hours at ambient temperature and made basic with 10% sodium hydroxide solution (150 ml.). The two layers were separated and the aqueous layer was extracted with methylene chloride. The combined organic layers were dried over sodium sulfate, filtered, and evaporated to dryness under reduced pressure. The residue was recrystallized from ethyl acetate to give 6.24 g. (57.3% yield) of yellow needles, M.P. 148–149° C. The analytical sample was recrystallized from a mixture of ethyl acetate and hexane as yellow needles, M.P. 150–151° C.

*Analysis.*—Calcd. for $C_{22}H_{27}ClN_4O_5$: C, 57.08; H, 5.88; Cl, 7.66; N, 12.10. Found: C, 56.98; H, 5.87; Cl, 7.43; N, 11.91.

(D) 2 - amino - 4,5 - dimethoxy - N - [3-[4-(o-chlorophenyl)-1 - piperazinyl]propyl]benzamide.—A slurry of the above nitrobenzamide (3.0 g., 0.0065 mole) in ethyl acetate (250 ml.) was catalytically reduced over Raney nickel (3.0 g.) under 3 atmospheres of hydrogen. The catalyst was filtered off, the filtrate was concentrated in 50 ml. under reduced pressure, hexane was added to the cloud point and the solution was allowed to cool overnight at —20° C., to give 1.6 g. (57% yield) of light pink needles, M.P. 110–112° C. The analytical sample was recrystallized from a mixture of ethyl acetate and hexane as colorless needles, M.P. 112–113° C.

*Analysis.*—Calcd. for $C_{22}H_{29}ClN_4O_3$: C, 61.03; H, 6.75; Cl, 8.19; N, 12.94. Found: C, 61.01; H, 6.98; Cl, 7.97; N, 13.10.

EXAMPLE IX 2-amino-4,5-dimethoxy-N-[3-[4-(m-chlorophenyl)-1-piperazinyl]propyl]benzamide (A) 1 - (m - chlorophenyl) - 4 - (2 - cyanoethyl) piperazine.—This compound was prepared by a modification of the method of C. B. Pollard, E. G. Rietz and R. Robbins, loc. cit., by heating on the steam bath for 20 hours a mixture of 1-(m-chlorophenyl) piperazine (81.0 g., 0.41 mole) and acrylonitrile (23.0 g., 0.43 mole). The residue was evaporated under reduced pressure to give 95 g. (92% yield) of crude nitrile which was used in the subsequent reaction without further purification.

(B) 1 - (m - chlorophenyl) - 4 - (3 - aminopropyl) piperazine.—The above nitrile (95 g., 0.38 mole) was reduced with lithium aluminum hydride (17 g., 0.45 mole) in ether and distilled through a short-path column to give 60.9 g. (63% yield) of pale yellow liquid, B.P. 176–180° C. (0.5 mm.), $nD_4^{20}$ 1.5775.

*Analysis.*—Calcd. for $C_{13}H_{20}ClN_3$: C, 61.52; H, 7.94; N, 16.56. Found: C, 61.81; H, 8.22; N, 16.88.

The trihydrochloride was prepared by adding dry hydrogen chloride to a solution of the amine in ether and recrystallizing the filter cake from a mixture of ethanol and ether to give a white solid, M.P. 155–190° C.

*Analysis.*—Calcd. for $C_{13}H_{23}Cl_4N_3$: C, 43.01; H, 6.38; N, 11.57. Found: C, 42.89; H, 6.26; N, 11.81.

(C) 2-nitro-4,5-dimethoxy-n-[3-[4-m-chlorophenyl)-1-piperazinyl]propyl]benzamide.—A solution of 2-nitro-4,5-dimethoxybenzoyl chloride (24.6 g., 0.10 mole) in benzene (200 ml.) was added to a stirred solution of 1-(m-chlorophenyl)-4-(3-aminopropyl) piperazine (25.5 g., 0.10 mole) in benzene (200 ml.). The mixture was stirred for 18 hours at ambient temperature and made basic with 10% sodium hydroxide solution. The two layers were separated, the aqueous layer was extracted with methylene chloride and the combined organic layers were evaporated to dryness under reduced pressure. The residue was recrystallized from ethyl acetate to give 36 g. (78% yield) of yellow needles, M.P. 152–156° C. The analytical sample was recrystallized several times from ethyl acetate to give yellow needles, M.P. 161–162° C.

*Analysis.*—Calcd. for $C_{22}H_{27}ClN_4O_5$: C, 57.08; H, 5.88; N, 12.10. Found: C, 56.86; H, 5.75; N, 12.14.

(D) 2 - amino-4,5-dimethoxy-n-[3-[4-chlorophenyl)-1-piperazinyl]propyl] benzamide.—A stirred mixture of the above nitrobenzamide (3.35 g., 0.0073 mole) and sodium dithionite (5.0 g., 0.029 mole) in ethanol (300 ml.) was refluxed 20 hours, filtered hot and evaporated to dryness under reduced pressure. The residue was recrystallized from ethyl acetate to give 1.0 g. (30% yield) of colorless needles, M.P. 135–137° C.

*Analysis.*—Calcd. for $C_{22}H_{29}ClN_4O_3$: C, 61.05; H, 6.75; N, 12.95. Found: C, 60.89; H, 6.73; N, 12.97.

EXAMPLE X 2-amino-4,5-dimethoxy-n-[3-[4-(p-chlorophenyl)-1-piperazinyl]propyl]benzamide (A) 1-(p-chlorophenyl)-4-(2-cyanoethyl) piperazine.—This compound was prepared by a modification of the method of Shin Hayao and R. N. Schut, loc. cit., by heating on the steam bath for 20 hours a mixture of 1-(p-chlorophenyl)-piperazine (35.0 g., 0.18 mole) and acrylonitrile (11.3 g., 0.21 mole). The crude nitrile was used in the subsequent reduction without further purification.

(B) 1 - (p - chlorophenyl)-4-(3-aminopropyl) piperazine.—The above nitrile (44.0 g., 0.18 mole) was reduced with lithium aluminum hydride (8.9 g., 0.23 mole) in ether and distilled through a short-path column to give 34.8 g. (77.5% yield) of pale yellow liquid, B.P. 170–180° C. (0.4 mm.).

(C) 2-nitro-4,5-dimethoxy-n-[3-[4-(p-chlorophenyl)-1-piperazinyl]propyl] benzamide.—A solution of 2-nitro-4,5-dimethoxybenzoyl chloride (7.7 g., 0.031 mole) in benzene (150 ml.) was added dropwise to a stirred solution of 1-(p-chlorophenyl)-4-(3-aminoethyl) piperazine (7.6 g., 0.030 mole) in benzene (50 ml.) under a nitrogen atmosphere. The mixture was stirred for 18 hours at ambient temperature, filtered, and the filter cake was recrystallized from a hot mixture of 30% aqueous sodium hydroxide solution (25 ml.) and isopropanol (250 ml.). The isopropanol solution was decanted from the lower aqueous phase and upon cooling deposited 10.6 g. (76% yield) of yellow needles, M.P. 170–172° C. The analytical sample was recrystallized from isopropanol solution as yellow needles, M.P. 172–174° C.

*Analysis.*—Calcd. for $C_{22}H_{27}ClN_4O_5$: C, 57.08; H, 5.88; Cl, 7.66; N, 12.10. Found: C, 56.70; H, 5.95; Cl, 8.04; N, 11.73.

(D) 2-amino-4,5-dimethoxy-n-[3-[4-(p-chlorophenyl)-1-piperazinyl]propyl]benzamide.—A slurry of the above nitrobenzamide (3.0 g., 0.0065 mole) in ethyl acetate (250 ml.) was catalytically reduced over Raney nickel (3.0 g.) under 3 atmospheres of hydrogen. The catalyst was filtered off and the filtrate was cooled to give 1.8 g. (64% yield) of colorless cubic crystals, M.P. 174–176° C. The analytical sample was recrystallized from ethyl acetate, M.P. 175–176° C.

*Analysis.*—Calcd. for $C_{22}H_{29}ClN_4O_3$: C, 61.03; H, 6.75; Cl, 8.19; N, 12.94. Found: C, 61.05; H, 6.68; Cl, 8.16; N, 12.96.

EXAMPLE XI 2-amino-3-methoxy-n-[2-(4-phenyl-1-piperazinyl) ethyl]benzamide (A) 2-nitro-3-methoxybenzoic acid.—The method used for the preparation of 2-nitro-4,5-dimethoxybenzoic acid in Example I was applied to the preparation of this compound. The product from nitration of m-methoxybenzoic acid (200 g., 1.32 moles) was recrystallized from ethanol to give 30.0 g. (11.5%) of pale yellow needles, M.P. 260–261° C.

(B) 2-nitro-3-methoxybenzoyl chloride.—Thionyl chloride (18.1 g., 0.152 mole) was added dropwise to a stirred suspension of the above acid (30.0 g., 0.152 mole) in dry benzene (350 ml.). The mixture was refluxed for 2 hours and then distilled to dryness under reduced pressure to give 31.5 g. (97.6% yield) of crude product.

(C) 2-nitro-3-methoxy-n-[2-(4-phenyl-1-piperazinyl) ethyl]benzamide.—A solution of 2-nitro-3-methoxybenzoyl chloride (6.45 g., 0.030 mole) in benzene (200 ml.) was added dropwise to a stirred solution of 1-phenyl-4-(2-aminoethyl) piperazine (6.15 g., 0.030 mole) and pyridine (6 ml.) in benzene (50 ml.) under nitrogen. The mixture was refluxed with stirring for 24 hours, cooled to room temperature and filtered. The filter cake was recrystallized from a mixture of 30% aqueous sodium hydroxide solution (15 ml.) and isopropanol (250 ml.). The hot supernatant isopropanol solution was decanted and cooled to give 5.4 g. (47% yield) of colorless needles, M.P. 151–153° C. The analytical sample was recrystallized from isopropanol as colorless needles, M.P. 152–153° C.

*Analysis.*—Calcd. for $C_{20}H_{24}N_4O_4$: C, 62.48; H, 6.29; N, 14.58. Found: C, 62.73; H, 6.29; N, 14.82.

(D) 2-amino-3-methoxy-n-[2-(4-phenyl-1-piperazinyl) ethyl]benzamide.—A solution of the above nitrobenzamide (1.9 g., 0.005 mole) in warm ethyl acetate (200 ml.) was catalytically reduced over 5% palladium-on-carbon (0.5 g.) under 3 atmospheres of hydrogen. The catalyst was filtered off and the filtrate was cooled to give 1.40 g. (79.1% yield) of colorless needles, M.P. 161–162° C.

*Analysis.*—Calcd. for $C_{20}H_{26}N_4O_2$: C, 67.77; H, 7.39; N, 15.81. Found: C, 67.86; H, 7.32; N, 15.67.

EXAMPLE XII 2-amino-3-methoxy-N-[3-(4-phenyl-1-piperazinyl) propyl]benzamide (A) 2 - nitro - 3 - methoxy - N - [3 - (4 - phenyl - 1 - piperazinyl)propyl]benzamide.—A solution of 1-phenyl-4-(3-aminopropyl) piperazine (6.6 g., 0.030 mole) in toluene (100 ml.) was added dropwise to a stirred solution of 2-nitro-3-methoxybenzoyl chloride (6.5 g., 0.03 mole) in toluene (100 ml.) under a nitrogen atmosphere. The mixture was stirred for 18 hours at ambient temperature and filtered. The filter-cake was recrystallized from a mixture of 20% aqueous sodium hydroxide solution (50 ml.) and isopropanol (250 ml.). The hot supenatant isopropanol solution was decanted and cooled to give 8.0 g. (67% yield) of pale yellow needles, M.P. 103–104° C. The analytical sample was recrystallized from ethyl acetate as colorless needles, M.P. 103–104° C.

*Analysis.*—Calcd. for $C_{21}H_{26}N_4O_4$: C, 63.30; H, 6.58; N, 14.06. Found: C, 63.04; H, 6.57; N, 13.96.

(B) 2 - amino - 3 - methoxy - N - [3 - (4 - phenyl - 1 - piperazinyl) propyl]benzamide.—A solution of the above nitrobenzamide (1.98 g., 0.005 mole) in warm ethyl acetate (200 ml.) was catalytically reduced over 5% palladium-on-carbon (0.5 g.) under 3 atmospheres of hydrogen. The catalyst was filtered off and the filtrate was evaporated to dryness under reduced pressure. The residue slowly crystallized to give 1.4 g. (76.0% yield) of colorless crystals, M.P. 77–78° C.

*Analysis.*—Calcd. for $C_{21}H_{28}N_4O_2$: C, 68.45; H, 7.66; N, 15.21. Found: C, 68.32; H, 7.70; N, 15.07.

EXAMPLE XIII 2-amino-3-methoxy-N-[4-(4-phenyl-1-piperazinyl) butyl]benzamide (A) 2 - nitro - 3 - methoxy - N - [4 - (4 - phenyl - 1 - piperazinyl)butyl]benzamide.—A suspension of 2-nitro-3-methoxybenzoyl chloride (6.45 g., 0.030 mole) in benzene (50 ml.) was added dropwise to a stirred solution of 1-phenyl-4-(4-aminobutyl) piperazine (7.0 g., 0.030 mole) and pyridine (6 ml.) in benzene (100 ml.) under nitrogen. The mixture was stirred for 18 hours at ambient temperature and filtered. The filter-cake was recrystallized from a mixture of 20% aqueous sodium hydroxide solution (50 ml.) and isopropanol (250 ml.). The hot supernatant isopropanol solution was decanted and cooled to give 5.0 g. (47.7% yield) of pale yellow crystals, M.P. 131–132° C. The analytical sample was recrystallized from isopropanol was pale yellow platelets, M.P. 133–134° C.

*Analysis.*—Calcd. for $C_{22}H_{28}N_4O_4$: C, 64.06; H, 6.84; N, 13.58. Found: C, 64.10; H, 6.78; N, 13.60.

(B) 2 - amino - 3 - methoxy - N - [4 - (4 - phenyl - 1 - piperazinyl)butyl]benzamide.—A solution of the above nitro compound (3.5 g., 0.0085 mole) in warm ethyl acetate (250 ml.) was catalytically reduced over 5% palladium-on-carbon (0.5 g.) under 3 atmospheres of hydrogen. The catalyst was filtered off and the filtrate was concentrated under reduced pressure and cooled to give 2.9 g. (90.6% yield) of colorless platelets, M.P. 131–132° C. The analytical sample was recrystallized from ethyl acetate as colorless platelets M.P. 131–132° C.

*Analysis.*—Calcd. for $C_{22}H_{30}N_4O_2$: C, 69.08; H, 7.91; N, 14.65. Found: C, 69.14; H, 7.79; N, 14.52.

EXAMPLE XIV 2-amino-4,5-methylenedioxy-N-[3-(4-phenyl-1-piperazinyl)propyl]benzamide (A) 2 - nitro - 4,5 - methylenedioxybenzoic acid.—The method used for the preparation of 2-nitro-4,5-dimethoxybenzoic acid in Example I was applied to the preparation of this compound. The product from nitration of piperonylic acid (200 g., 1.2 moles) was recrystallized from hot water to give 126 g. (49.6% yield) of pale yellow needles, M.P. 173–174° C.

(B) 2-nitro-4,5-methylenedioxybenzoyl chloride.—Thionyl chloride (6.0 g., 0.05 mole) was added dropwise to a stirred suspension of the above acid (10.5 g., 0.05 mole) in benzene (100 ml.). The mixture was refluxed for 2 hours and then evaporated to dryness under reduced pressure to give the crude acid chloride.

(C) 2 - nitro - 4,5 - methylenedioxy - N - [3 - (4 - phenyl-1-piperazinyl)propyl]benzamide.—A solution of 1-phenyl-4-(3-aminopropyl) piperazine (10.9 g., 0.050 mole) in benzene (100 ml.) was added dropwise to a stirred solution of 2-nitro-4,5-methylenedioxybenzoyl chloride (11.4 g., 0.050 mole) in benzene (200 ml.) under a nitrogen atmosphere. The mixture was stirred for 3 hours at ambient temperature and filtered. The filter-cake was recrystallized from a mixture of 30% aqueous sodium hydroxide solution (50 ml.) and hot isopropanol (500 ml.). The hot supernatant isopropanol solution was decanted and cooled to give a tan solid which was recrystallized from a mixture of ethyl acetate and hexane to give 9.2 g. (45.1% yield) of pale yellow crystals, M.P. 104–106° C. The analytical sample was recrystallized from a mixture of ethyl acetate and hexane, M.P. 105–106° C.

*Analysis.*—Calcd. for $C_{22}H_{24}N_4O_5$: C, 61.15; H, 5.87; N, 13.58. Found: C, 61.36; H, 6.04; N, 13.23.

(D) 2-amino-4,5-methylenedioxy-N-[3-(4-phenyl-1-piperazinyl)propyl]benzamide.—A solution of the above nitro compound (3.5 g., 0.0085 mole) in ethyl acetate (250 ml.) was catalytically reduced over 5% palladium-on-carbon (0.5 g.) under 3 atmospheres of hydrogen. The catalyst was filtered off and the filtrate was cooled to give 2.2 g. (68.1% yield) of colorless cubic crystals, M.P. 169–170° C. The analytical sample was recrystallized from ethyl acetate as colorless cubic crystals, M.P. 170–171° C.

*Analysis.*—Calcd. for $C_{21}H_{26}N_4O_3$: C, 65.95; H, 6.85; N, 14.65. Found: C, 65.95; H, 6.76; N, 14.70.

EXAMPLE XV 2-amino-4,5-methylenedioxy-N-[4-(4-phenyl-1-piperazinyl)butyl]benzamide (A) 2-nitro-4,5-methylenedioxy-N-[4-(4-phenyl-1-piperazinyl)butyl] benzamide.—A solution of 1-phenyl-4-aminobutyl) piperazine (11.6 g., 0.0050 mole) in benzene (100 ml.) was added dropwise to a stirred solution of 2-nitro-4,5-methylenedioxybenzoyl chloride (11.4 g., 0.050 mole) in benzene (200 ml.) under nitrogen. The mixture was stirred for 1 hour at ambient temperature and filtered. The filter-cake was recrystallized from a mixture of 30% aqueous sodium hydroxide solution (50 ml.) and hot isopropanol (500 ml.) The hot supernatant isopropanol solution was decanted and cooled to give a light pink solid which was recrystallized from isopropanol to give 11.0 g. (52.1% yield) of pale yellow platelets, M.P. 178–180° C. The analytical sample was recrystallized from ethyl acetate as pale yellow platelets, M.P. 180–181° C.

*Analysis.*—Calcd. for $C_{22}H_{26}N_4O_5$: C, 61.96; H, 6.15; N, 13.14. Found: C, 62.14; H, 6.10; N, 13.15.

(B) 2-amino-4,5-methylenedioxy-N-[4-(4-phenyl-1-piperazinyl)butyl] benzamide.—A solution of the above nitro compound (3.0 g., 0.0070 mole) in ethyl acetate (250 ml.) was catalytically reduced over 5% palladium-on-carbon (0.5 g.) under 3 atmospheres of hydrogen. The catalyst was filtered off and the filtrate was cooled to give 1.4 g. (50.0% yield) of colorless platelets, M.P. 138–139° C.

*Analysis.*—Calcd. for $C_{22}H_{28}N_4O_3$: C, 66.64; H, 7.12; N, 14.13. Found: C, 66.52; H, 7.38; N, 14.01.

EXAMPLE XVI 2-amino-3,4,5-trimethoxy-N-[3-(4-phenyl-1-piperazinyl)propyl] benzamide (A) Methyl 3,4,5-trimethoxy benzoate.—This compound was prepared according to the method of C. J. Overmeyer, J. AM. Chem. Soc., 49, 499 (1927) by adding gallic acid (100 g., 0.471 mole) to methanol (500 ml.) saturated with dry hydrogen chloride at 0° C. The mixture was refluxed 3 hours, cooled and filtered to give 100 g. (94.0% yield) of the ester, M.P. 79–80° C.

(B) Methyl 2-nitro-3,4,5-trimethoxy benzoate.—This compound was prepared according to the method of K. I. H. Williams et al., J. AM. Chem. Soc., 82, 3982 (1960) by the slow addition of powdered cupric nitrate (61 g., 0.25 mole) to a solution of the above ester (45 g., 0.2 mole) in acetic anhydride (225 ml.) at such a rate as to maintain a temperature of 50–65° C. The mixture was stirred at ambient temperature for 1 hour and poured onto cracked ice (1 kg.). The solid which separated was filtered, air dried, dissolved in benzene (200 ml.) and passed over a column of alumina (25 g.). The column was eluted with a mixture of 4:2 benzene and ether (total of 30 ml.) and the combined eluates were evaporated to dryness under reduced pressure to give 36 g. (67% yield) of the crude ester, M.P. 59–61° C.

(C) 2-nitro-3,4,5-trimethoxybenzoic acid.—The above nitro ester (36 g., 0.13 mole) was refluxed for 2 hours in methanol containing potassium hydroxide (20 g. dissolved in a minimum of water). The methanol was removed under reduced pressure, the residue was dissolved in ice-water (500 g.) and acidified with diluted hydrochloric acid. The solid which separated was filtered and air dried to give 24 g. (70.6% yield) of colorless crystals, M.P. 165–167° C.

(D) 2-nitro-3,4,5-trimethoxybenzoyl chloride.—Thionyl chloride (25 g., 0.21 mole) was added dropwise to a stirred solution of the above nitro acid (24 g., 0.093 mole) in benzene (300 ml.). The mixture was refluxed for 3 hours and then distilled to dryness under reduced pressure to give 24 g. (94% yield) of the crude acid chloride.

(E) 2-nitro-3,4,5-trimethoxy-N-[3-(4-phenyl-1-piperazinyl) propyl] benzamide.—A solution of 2-nitro-3,4,5-trimethoxybenzoyl chloride (6.9 g., 0.025 mole) in benzene (200 ml.) was added dropwise to a stirred solution of 1-phenyl-4-(3-aminopropyl) piperazine (5.4 g., 0.025 mole) and pyridine (5 ml.) in benzene (100 ml.). The mixture was refluxed for 2 hours, cooled to room temperature and filtered. The filter-cake was suspended in excess dilute potassium hydroxide solution, stirred for 1 hour and filtered. The filter-cake was recrystallized from isopropanol several times and then ethanol to give 4.0 g. (35.4% yield) of colorless needles, M.P. 119–121° C.

*Analysis.*—Calcd. for $C_{23}H_{30}N_4O_6$: C, 60.25; H, 6.60; N, 12.22. Found: C, 60.23; H, 6.94; N, 12.40.

(F) 2-amino-3,4,5-trimethoxy-N-[3-(4-phenyl-1-piperazinyl) propyl] benzamide.—A solution of the above nitrobenzamide (3.5 g., 0.0076 mole) in absolute ethanol (50 ml.) was catalytically reduced over 10% palladium-on-carbon (0.5 g.) under 3 atmospheres of hydrogen. The catalyst was filtered off and the filtrate was evaporated under reduced pressure. The oily residue was recrystallized from ethyl acetate to give 2.5 g. (76.5% yield) of colorless solid, M.P. 107–108° C. The analytical sample was recrystallized from a mixture of ethyl acetate and hexane as colorless needles, M.P. 109–110° C.

*Analysis.*—Calcd. for $C_{23}H_{32}N_4O_4$: C, 64.46; H, 7.53; N, 13.08. Found: C, 64.34; H, 7.46; N, 13.12.

EXAMPLE XVII 2-amino-4,5-diethoxy-N-[3-(4-phenyl-1-piperazinyl) propyl] benzamide (A) 3,4-diethoxybenzoic acid.—Diethyl sulfate 577 g. (3.75 moles) was added dropwise to a cold (10° C.) stirred solution of protocatechuic acid (288 g., 1.87 moles) and sodium hydroxide (230 g., 5.62 moles) in water (500 ml.). The stirred mixture was then refluxed 2 hours, cooled and filtered to remove insoluble impurities. The filtrate was acidified with dilute sulfuric acid and filtered. After drying, the crude acid was recrystallized from 50% ethanol to give 190 g. (48.4% yield) of colorless crystals, M.P. 164–166° C.

(B) 2-nitro-4,5-diethoxybenzoic acid.—The method used for the preparation of 2-nitro-4,5-dimethoxybenzoic acid in Example I was applied to the preparation of this compound. The product from nitration of 3,4-diethoxybenzoic acid (190 g., 0.905 mole) was slurried in 10% sodium bicarbonate solution and reprecipitated with hydrochloric acid to give 89.9 g. (39% yield) of yellow needles, M.P. 145–147° C.

(C) 2 - nitro - 4,5-diethoxybenzoyl chloride.—Thionyl chloride (3.6 g., 0.03 mole) was added dropwise to a stirred suspension of the above acid (7.7 g., 0.03 mole) in benzene (100 ml.). The mixture was refluxed for 2 hours and distilled to dryness under reduced pressure to give 8.2 g. (94.3% yield) of the crude acid chloride.

(D) 2 - nitro - 4,5 - diethoxy - N - [3 - (4 - phenyl - 1-piperazinyl) propyl] benzamide.—A solution of 2-nitro-4,5-diethoxybenzoyl chloride (8.2 g., 0.03 mole) in benzene (100 ml.) was added dropwise to an ice cold stirred mixture of 1-phenyl-4-(3-aminopropyl) piperazine (6.6 g., 0.03 mole), benzene (6 ml.) and 20% sodium hydroxide solution 9.4 ml.) under a nitrogen atmosphere. After stirring at ambient temperature for 18 hours, the solid product was filtered to give 10.2 g. (74.3% yield) of tan needles, M.P. 153–155° C. The analytical sample was recrystallized from isopropanol to give pale yellow needles, M.P. 154–155° C.

Analysis.—Calcd. for $C_{24}H_{32}N_4O_5$: C, 63.14; H, 7.07; N, 12.27. Found: C, 63.24; H, 7.04; N, 11.98.

(E) 2 - amino - 4,5 - diethoxy - N - [3 - (4 - phenyl-1-piperazinyl) propyl] benzamide.—A solution of the above nitrobenzamide (2.28 g., 0.0050 mole) in ethyl acetate (200 ml.) was catalytically reduced over 5% palladium-on-carbon (0.5 g.) under 3 atmospheres of hydrogen. The catalyst was filtered off and the filtrate was reduced in vacuo to a small volume from which the product crystallized to give 1.45 g. (47% yield) of light pink needles, M.P. 119–121° C. The analytical sample was recrystallized from ethyl acetate as colorless needles, M.P. 117–118° C.

Analysis.—Calcd. for $C_{24}H_{34}N_4O_3$: C, 67.58; H, 8.03; N, 13.21. Found: C, 67.59; H, 7.96; N, 13.14.

EXAMPLE XVIII 2-acetylamino-4,5-dimethoxy-N-[3-(4-phenyl-1-piperazinyl) propyl] benzamide (A) 2 - acetylamino - 4,5 - dimethoxy - N - [3 - (4-phenyl- - 1 - piperazinyl) propyl] benzamide hydrochloride.—Acetyl chloride (6 ml., 0.084 mole) was added dropwise to a stirred suspension of 2-amino-4,5-dimethoxy - N - [3-(4-phenyl-1-piperazinyl) propyl] benzamide (3.0 g., 0.0075 mole) in benzene (20 ml.). The mixture was filtered and the filter-cake was washed with benzene, air dried, and recrystallized from water to give 2.5 g. (70% yield) of colorless rhombic crystals, M.P. 116–119° C.

Analysis.—Calcd. for $C_{24}H_{34}ClN_4O_4$: C, 60.30; H, 7.17; Cl, 7.42; N, 11.72. Found: C, 60.51; H, 7.22; Cl, 7.60; N, 11.77.

(B) 2 - acetylamino - 4,5 - dimethoxy-N-[3-(4-phenyl-1-piperazinyl)propyl] benzamide.—A portion of the hydrochloride (0.69 g., 0.0014 mole) was dissolved in water (10 ml.) and sodium carbonate was added until carbon dioxide evolution ceased. The resultant precipitate was filtered and recrystallized from ethanol to give 0.41 g. (64% yield) of colorless needles, M.P. 117–119° C.

Analysis.—Calcd. for $C_{24}H_{33}N_4O_4$: C, 65.28; H, 7.53; N, 12.69. Found: C, 65.36; H, 7.30; N, 12.59.

EXAMPLE XIX 2-amino-4,5-dimethoxy-N-[3-(4-methyl-1-piperazinyl) propyl] benzamide trihydrochloride (A) 2 - nitro - 4,5 - dimethoxy-[3-(4-methyl-1-piperazinyl) propyl] benzamide.—A solution of 1-methyl-4-(3-aminopropyl) piperazine (7.5 g., 0.048 mole) in benzene (100 ml.) was added dropwise to a stirred solution of 2-nitro-4,5-dimethoxybenzoyl chloride (11.6 g., 0.047 mole) in benzene (200 ml.) under a nitrogen atmosphere. The resultant suspension was stirred for 1 hour, filtered and dissolved in water. The solution was made basic with 50% sodium hydroxide solution and extracted with methylene chloride. The methylene chloride extracts were dried over sodium sulfate, filtered and evaporated to dryness under reduced pressure. The residue was recrystallized from a mixture of ethyl acetate and hexane to give 10.4 g. (60.1% yield) of pale yellow solid, M.P. 105–107° C. The analytical sample was recrystallized from a mixture of ethyl acetate and hexane as colorless needles, M.P. 106–107° C.

Analysis.—Calcd. for $C_{17}H_{26}N_4O_5$: C, 55.72; H, 7.15; N, 15.29. Found: C, 55.71; H, 7.39; N, 15.08.

(B) 2 - amino - 4,5 - dimethoxy - N-[3-(4-methyl-1-piperazinyl) propyl] benzamide trihydrochloride.—A solution of the above nitrobenzamide (2.0 g., 0.0055 mole) in ethyl acetate (200 ml.) was catalytically reduced over Raney nickel (2.0 g.) under 3 atmospheres of hydrogen. The catalyst was filtered off and the filtrate was evaporated under reduced pressure to give a clear oily residue which could not be crystallized. The residue was dissolved in a mixture of ethyl acetate and hexane and dry hydrogen chloride was passed through the solution to precipitate out of the trihydrochloride. The precipitate was recrystallized from methanol to give 1.4 g. (56.0% yield) of colorless solid, M.P. 266–269° C.

Analysis.—Calcd. for $C_{17}H_{31}Cl_3N_4O_3$: C, 45.80; H, 7.01; Cl, 23.86; N, 12.57. Found: C, 45.67; H, 6.69; Cl, 24.20; N, 12.49.

EXAMPLE XX 2-amino-4,5-dimethoxy-N-[3-[4-(o-fluorophenyl)-1-piperazinyl] propyl] benzamide (A) 1 - (o-fluorophenyl) piperazine.—This compound was prepared according to the method of R. Ratouis, J. Boissier and C. Dumont, J. MED. CHEM., 8, (1), 104–107 (1965) by heating a stirred mixture of o-fluoroaniline (100 g., 0.90 mole), diethanolamine (86.1 g., 0.82 mole) and conc. hydrochloric acid (163 ml.) at 130° C. until most of the water distilled off and then at 270° C. for 5 hours. After cooling, the residual dark oil was neutralized with a solution of sodium hydroxide (81.5 g.) in water (150 ml.). The resultant mixture was extracted with chloroform and the extracts were dried over sodium sulfate, filtered and distilled to give 59.1 g. (40.0% yield) of pale yellow liquid, B.P. 81.87° C. (0.05–0.3 mm.), $nD_4^{20}$ 1.6723.

(B) 1 - (o - fluorophenyl) - 4 - (2 - cyanoethyl) piperazine.—A stirred mixture of 1-(o-fluorophenyl) piperazine (29.5 g., 0.164 mole), 2-chloropropionitrile (14.7 g., 0.164 mole) and sodium carbonate (17.4 g., 0.164 mole) in isopropanol (150 ml.) was refluxed for 20 hours. The inorganic salt was filtered while hot and the filtrate was cooled to give 29.0 g. (76.0%) of white crystals, M.P. 55–56° C.

(C) 1 - (o - fluorophenyl) - 4-(3-aminopropyl) piperazine.—The above nitrile (28 g., 0.12 mole) was reduced with lithium aluminum hydride (9.2 g., 0.24 mole) in ether and distilled through a short-path column to give 24.3 g. (85.5% yield) of colorless liquid, B.P. 142° C. (0.2 mm.), $nD_4^{20}$ 1.5421.

(D) 2 - nitro - 4,5 - dimethoxy - N - [3-[4-(o-fluorophenyl)-1-piperazinyl] propyl] benzamide.—A solution of 1-(o-fluorophenyl)-4-(3-aminopropyl) piperazine in benzene (50 ml.) was added to a stirred solution of 2-nitro-4,5-dimethoxybenzoyl chloride (7.5 g., 0.031 mole) in benzene (200 ml.). The mixture was stirred for 2 hours, made basic with 10% aqueous sodium hydroxide solution (40 ml.) and the benzene layer was separated, washed with water and dried over potassium carbonate. The benzene solution was concentrated to 50 ml. under reduced pressure, pentane (100 ml.) was added and the product crystallized to give 8.2 g. (62% yield) of yellow needles. M.P. 159–160° C. The analytical sample was recrystallized from isopropanol as pale yellow needles, M.P. 159–161° C.

Analysis.—Calcd. for $C_{22}H_{27}FN_4O_5$: C, 59.18; H, 6.10;

F, 4.26; N, 12.55. Found: C, 59.32; H, 6.08; F, 4.41; N, 12.54.

(E) 2 - amino - 4,5 - dimethoxy-N-[3-[4-(o-fluorophenyl)-1-piperazinyl] propyl] benzamide.—A solution of the above nitrobenzamide (5.0 g., 0.011 mole) in ethyl acetate (300 ml.) was catalytically reduced over Raney nickel (5 g.) under 3 atmospheres of hydrogen. The catalyst was filtered off, the filtrate was concentrated to 100 ml. under reduced pressure, pentane (200 ml.) was added and the solution was allowed to cool overnight at −5° C. to give 4.2 g. (90.0% yield) of colorless needles, M.P. 127–132° C. The analytical sample was recrystallized from a mixture of ethyl acetate and hexane as colorless needles, M.P. 128–132° C.

*Analysis*.—Calcd. for $C_{22}H_{29}FN_4O_3$: C, 63.44; H, 7.02; F, 4.56; N, 13.45. Found: C, 63.22; H, 6.95; F, 4.64; N, 13.31.

EXAMPLE XXI 2-amino-4,5-dimethoxy-N-[3-[4-(m-fluorophenyl)-1-piperazinyl] propyl] benzamide (A) 1-(m-fluorophenyl) piperazine.—This compound was prepared according to the method of P. Janssen, U.S. 2,979,507; CHEM. ABSTR. 55, P 18785c, by heating a stirred mixture of m-fluoroaniline (100 g., 0.90 mole), diethanolamine (105 g., 1.0 mole) and conc. hydrochloric acid (159 ml.) at 130° C. until most of the water was removed and then at 250° for 4 hours. After neutralization with sodium hydroxide solution and extraction with chloroform the product was distilled to give 58.2 g. (36.0% yield) of colorless liquid, B.P. 94° C. (0.05 mm.), $nD_4^{20}$ 1.5676.

(B) 1-(m-fluorophenyl)-4-(2-cyanoethyl) piperazine.— A stirred mixture of 1-(m-fluorophenyl) piperazine (28.0 g., 0.16 mole), 2-chloropropionitrile (14.3 g., 0.16 mole) and sodium carbonate (17.0 g., 0.16 mole) in isopropanol (150 ml.) was refluxed for 20 hours. The inorganic salt was filtered while hot and the filtrate was cooled to give 32.0 g. (88.2% yield) of colorless crystals, M.P. 48–50° C.

(C) 1-(m-fluorophenyl) - 4-(3-aminopropyl) piperazine.—The above nitrile (30.9 g., 0.132 mole) was reduced with lithium aluminum hydride (10.0 g., 0.264 mole) in ether and distilled through a short-path column to give 26.6 g. (84.7% yield) of colorless liquid, B.P. 156° C. (0.25 mm.).

(D) 2-nitro - 4,5-dimethoxy-n-[3-[4-(m-fluorophenyl)-1-piperazinyl]propyl]benzamide.—A solution of 1-(m-fluorophenyl)-4-(3-aminopropyl) piperazine (7.1 g., 0.030 mole) in benzene (50 ml.) was added dropwise to a stirred solution of 2-nitro-4,5-dimethoxybenzoyl chloride (7.7 g., 0.031 mole) in benzene (200 ml.) under a nitrogen atmosphere. The mixture was stirred for 18 hours at ambient temperature, filtered, and the filter-cake was recrystallized from a hot mixture of 30% aqueous sodium hydroxide solution and isopropanol. The hot supernatant isopropanol solution was decanted and cooled to give 8.9 g. (67% yield) of yellow crystals, M.P. 170–172° C. The analytical sample was recrystallized from ethyl acetate as pale yellow needles, M.P. 170–171.5° C.

*Analysis*.—Calcd. for $C_{22}H_{27}FN_4O_5$: C, 59.18; H, 6.10; F, 4.26; N, 12.55. Found: C, 59.09; H, 5.93; F, 4.33; N, 12.55.

(E) 2-amino-4,5-dimethoxy-n-[3-[4-(m-fluorophenyl)-1-piperazinyl]propyl]benzamide.—A solution of the above nitrobenzamide (2.23 g., 0.0050 mole) in ethyl acetate (200 ml.) was catalytically reduced over Raney nickel under 3 atmospheres of hydrogen. The catalyst was filtered off and the filtrate was cooled to give 1.2 g. (57.8% yield) of colorless needles, M.P. 165–167° C. The analytical sample was recrystallized from ethyl acetate as colorless needles, M.P. 167.5–168.5° C.

*Analysis*.—Calcd. for $C_{22}H_{29}FN_4O_3$: C, 63.44; H, 7.02; F, 4.56; N, 13.45. Found: C, 63.36; H, 6.89; F, 4.81; N, 13.41.

EXAMPLE XXII 2-amino-4,5-dimethoxy-n-[3-[4-(p-fluorophenyl)-1-piperazinyl]propyl]benzamide (A) 1-(p-fluorophenyl) piperazine.—This compound was prepared according to the method of P. Jansen, loc. cit., by heating a stirred mixture of p-fluoroaniline (68.6 g., 0.62 mole), diethanolamine (71.8 g., 0.68 mole) and conc. hydrochloric acid (109 ml.) at 130° C. until most of the water was removed and then at 280° C. for 3 hours. After neutralization with sodium hydroxide solution and extraction with chloroform the product was distilled to give 60.0 g. (53.1% yield) of amber liquid, B.P. 105–120° C. (0.7 mm.).

(B) 1-(p-fluorophenyl)-4-(2-cyanoethyl) piperazine.— A stirred mixture of 1 - (p - fluorophenyl) piperazine (28.5 g., 0.158 mole), 2-chloropropionitrile (14.1 g., 0.158 mole) and sodium carbonate (16.8 g., 0.158 mole) in isopropanol (450 ml.) was refluxed for 20 hours. The inorganic salt was filtered while hot and the filtrate was cooled to give 31.4 g. (85.1% yield) of colorless crystals, M.P. 90–92° C.

(C) 1-(p-fluorophenyl)-4-(3-aminopropyl) piperazine.— The above nitrile (29.0 g., 0.124 mole) was reduced with lithium aluminum hydride (9.4 g., 0.246 mole) in ether and distilled through a short-path column to give 27.5 g. (93.2% yield) of colorless liquid, B.P. 148–154° C. (0.1 mm.).

(D) 2-nitro-4,5-dimethoxy-n-[3-[4-(p-fluorophenyl)-1-piperazinyl]propyl]benzamide.—A solution of 1-(p-fluorophenyl)-4-(3-aminopropyl) piperazine (6.3 g., 0.027 mole) in benzene (100 ml.) was added dropwise to a stirred solution of 2-nitro-4,5-dimethoxybenzoyl chloride (6.5 g., 0.026 mole) in benzene (200 ml.) under a nitrogen atmosphere. The mixture was stirred for 4 hours at ambient temperature and filtered. The filter-cake was recrystallized from a hot mixture of 30% aqueous sodium hydroxide solution and isopropanol (300 ml.). The hot supernatant isopropanol solution was decanted and cooled to give 8.2 g. (69.5% yield) of yellow needles, M.P. 165–167° C. The analytical sample was recrystallized from ethyl acetate as pale yellow needles, M.P. 167–168° C.

*Analysis*.—Calcd. for $C_{22}H_{27}FN_4O_5$: C, 59.18; H, 6.10; F, 4.26; N, 12.55. Found: C, 59.27; H, 6.20; F, 4.29; N, 12.56.

(E) 2-amino-4,5-dimethoxy-n-[3-[4-p-fluorophenyl]-1-piperazinyl]propyl]benzamide.—A solution of the above nitrobenzamide (2.1 g., 0.005 mole) in ethyl acetate (250 ml.) was catalytically reduced over Raney nickel (2 g.) under 3 atmospheres of hydrogen. The catalyst was filtered off and the filtrate was cooled to give 1.8 g. (90.0% yield) of colorless needles, M.P. 174–175° C. The analytical sample was recrystallized from ethyl acetate as colorless needles, M.P. 175–176° C.

*Analysis*.—Calcd. for $C_{22}H_{29}FN_4O_3$: C, 63.44; H, 7.02; F, 4.56; N, 13.45. Found: C, 63.33; H, 7.10; F, 4.72; N, 13.63.

EXAMPLE XXIII 2-amino-4,5-dimethoxy-N-[3-[4-(m-trifluoromethylphenyl)-1-piperazinyl]propyl]benzamide (A) 1-(m-trifluoromethylphenyl) piperazine hydrobromide.—This compound was prepared according to the method of A. Ash, A. Creighton and W. Wragg, Brit. 948,766; CHEM. ABSTR. 60, P 12029a, by heating a stirred mixture of m-trifluoromethylaniline (100 g., 0.62 mole) diethanolamine (66.0 g., 0.63 mole) and 48% hydrobromic acid (142.5 ml.) to 180° C. until most of the water was removed and then at 180–200° C. for 2 hours. The reaction mixture was cooled and twice recrystallized from water to give 107 g. (55.3% yield) of tan needles, M.P. 250–252° C.

(B) 1 - (m - trifluoromethylphenyl) - 4 - (2 - cyanoethyl)piperazine.—A stirred mixture of 1-(m-trifluoromethylphenyl)-piperazine hydrobromide (41.7 g., 0.134 mole), 2-chloropropionitrile (12.0 g., 0.134 mole) and sodium carbonate (42.6 g., 0.402 mole) in isopropanol (450 ml.) was refluxed for 20 hours. The inorganic salt was filtered while hot and the filtrate was distilled to give 32.0 g. (84.2% yield) of light yellow liquid, B.P. 168–174° C. (0.01 mm.).

(C) 1 - (m-trifluoromethylphenyl) - 4 - (3 - aminopropyl) piperazine.—The above nitrile (30.0 g., 0.106 mole) was reduced with lithium aluminum hydride (8.1 g., 0.212 mole) in ether and distilled through a short-path column to give 26.4 g. (86.6% yield) of colorless liquid, B.P. 143–151° C. (0.4 mm.).

(D) 2 - nitro - 4,5 - dimethoxy - N - [3-4-(m-trifluoromethylphenyl) - 1 - piperazinyl]propyl]benzamide.—A solution of 1-(m-trifluoromethylphenyl)-4-(3-aminopropyl) piperazine (7.6 g., 0.026 mole) in benzene (100 ml.) was added dropwise to a stirred solution of 2-nitro-4,5-dimethoxy benzoyl chloride (6.5 g., 0.026 mole) in benzene (200 ml.) under a nitrogen atmosphere. The mixture was stirred for 4 hours at ambient temperature and filtered. The filter-cake was dissolved in 10% aqueous sodium hydroxide solution (125 ml.) and the solution was extracted with methylene chloride. After drying over sodium sulfate, the methylene chloride solution was evaporated to dryness under reduced pressure. The residue was recrystallized from a mixture of ethyl acetate and hexane to give 8.4 g. (63.6% yield) of yellow crystals, M.P. 142–143° C. The analytical sample was recrystallized from isopropanol as pale yellow platelets, M.P. 143–144° C.

*Analysis.*—Calcd. for $C_{23}H_{27}F_3N_4O_5$: C, 55.64; H, 5.48; F, 11.48; N, 11.29. Found: C, 55.72; H, 5.59; F, 11.56; N, 11.30.

(E) 2 - amino - 4,5 - dimethoxy - N - [3-[4-(m-trifluoromethylphenyl) - 1 - piperazinyl]propyl]benzamide.—A solution of the above nitrobenzamide (3.0 g., 0.006 mole) in ethyl acetate (250 ml.) was catalytically reduced over Raney nickel (3.0 g.) under 3 atmospheres of hydrogen. The catalyst was filtered off and the filtrate was evaporated to dryness under reduced pressure. The residue was recrystallized from a mixture of ethyl acetate and hexane to give 2.0 g. (71.4% yield) of colorless platelets, M.P. 132–133° C.

*Analysis.*—Calcd. for $C_{23}H_{29}F_3N_4O_3$: C, 59.21; H., 6.27; F, 12.22; N, 12.01. Found: C, 59.43; H, 6.43; F, 12.40; N, 12.18.

EXAMPLE XXIV 2-amino-3-methoxy-N-[2-[4-(o-fluorophenyl)-1-piperazinyl]ethyl]benzamide (A) 1-(o-fluorophenyl)-4-(cyanomethyl) piperazine.—A stirred mixture of 1-(o-fluorophenyl) piperazine (29.5 g., 0.164 mole), chloroacetonitrile (12.4 g., 0.164 mole) and sodium carbonate (17.4 g., 0.164 mole) in isopropanol (150 ml.) was refluxed for 20 hours. The inorganic salt was filtered while hot and the filtrate was cooled to give 29.5 g. (82.0% yield) of tan crystals, M.P. 71–73° C.

(B) 1-(o-fluorophenyl)-4-(2-aminoethyl) piperazine.—The above nitrile (28.5 g., 0.13 mole) was reduced with lithium aluminum hydride (9.8 g., 0.26 mole) in ether and distilled through a short-path column to give 28.1 g. (96.5% yield) of colorless liquid, B.P. 129° C. (0.35 mm.), $nD_4^{20}$ 1.5413.

(C) 2-nitro - 3 - methoxy - N - [2-[4-(o-fluorophenyl)-1-piperazinyl]ethyl]benzamide.—A solution of 1-(o-fluorophenyl-4-(2-aminoethyl) piperazine (6.7 g., 0.03 mole) in benzene (50 ml.) was added dropwise to a stirred solution of 2-nitro-3-methoxybenzoyl chloride (6.8 g., 0.03 mole) in benzene (200 ml.) under a nitrogen atmosphere. The mixture was stirred for 20 hours at ambient temperature and filtered. The filter-cake was recrystallized from a hot mixture of 30% aqueous sodium hydroxide solution and isopropanol. The hot supernatant isopropanol solution was decanted and cooled to give 10.3 g. (86.0% yield) of colorless needles, M.P. 150–152° C.

The analytical sample was recrystallized from ethyl acetate as colorless needles, M.P. 150–151.5° C.

*Analysis.*—Calcd. for $C_{20}H_{23}FN_4O_4$: C, 59.69; H, 5.76; F, 4.72; N, 13.92. Found: C, 59.77, H, 5.93; F, 4.55; N, 13.81.

(D) 2 - amino - 3 - methoxy - N - [2-[4-(o-fluorophenyl) - 1 - piperazinyl]ethyl]benzamide.—A solution of the above nitrobenzamide (2.01 g., 0.005 mole) in ethyl acetate (200 ml.) was catalytically reduced over Raney nickel (2 g.) under 3 atmospheres of hydrogen. The catalyst was filtered off and the filtrate was cooled to give 1.4 g. (74.5% yield) of colorless platelets, M.P. 138–140° C.

*Analysis.*—Calcd. for $C_{20}H_{25}FN_4O_2$: C, 64.50; H, 6.77; F, 5.10; N, 15.04. Found: C, 64.13; H. 6.62; F, 5.47; N, 14.89.

EXAMPLE XXV 2-amino-3-methoxy-N-[2-[4-(m-fluorophenyl)-1-piperazinyl]ethyl]benzamide (A) 1 - (m - fluorophenyl) - 4 - (cyanomethyl) piperazine.—A stirred mixture of 1-(m-fluorophenyl) piperazine (28.0 g., 0.16 mole), chloroacetonitrile (12.1 g., 0.16 mole) and sodium carbonate (17.0 g., 0.16 mole) in isopropanol (150 ml.) was refluxed for 20 hours. The inorganic salt was filtered while hot and the filtrate was cooled to give 31.7 g. (93% yield) of tan crystals, M.P. 84.85° C.

(B) 1 - (m - fluorophenyl) - 4 - (2 - aminoethyl) piperazine.—The above nitrile (30.6 g., 0.14 mole) was reduced with lithium aluminum hydride (10.6 g., 0.28 mole) in ether and distilled through a short-path column to give 26.3 g. (84.5% yield) of colorless liquid, B.P. 152° C. (0.05 mm.).

(C) 2 - nitro - 3 - methoxy-N-[2-[4-(m-fluorophenyl)-1-piperazinyl]ethyl]benzamide.—A solution of 1-(m-fluorophenyl)-4-(2-aminoethyl) piperazine (6.7 g., 0.03 mole) in benzene (50 ml.) was added dropwise to a stirred solution of 2-nitro-3-methoxybenzoyl chloride (6.8 g., 0.03 mole) in benzene (200 ml.) under a nitrogen atmosphere. The mixture was stirred at ambient temperature for 20 hours and filtered. The filter-cake was recrystallized from a hot mixture of 30% aqueous sodium hydroxide solution and isopropanol. The hot supernatant isopropanol solution was decanted and cooled to give 10.6 g. (88.4% yield) of pale yellow needles, M.P. 144–146° C. The analytical sample was recrystallized from ethyl acetate as pale yellow needles, M.P. 145–146° C.

*Analysis.*—Calcd. for $C_{20}H_{23}FN_4O_4$: C, 59.69; H, 5.76; F, 4.72; N, 13.92. Found: C, 59.48; H, 5.64; F, 5.06; N, 13.98.

(D) 2 - amino - 3 - methoxy-N-[2-[4-(m-fluorophenyl-1-piperazinyl]ethyl]benzamide.—A solution of the above nitrobenzamide (2.01 g., 0.005 mole) in ethyl acetate (200 ml.) was catalytically reduced over Raney nickel (2 g.) under 3 atmospheres of hydrogen. The catalyst was filtered off and the filtrate was cooled to give 1.2 g. (65% yield) of colorless needles, M.P. 155–156° C. The analytical sample was recrystallized from ethyl acetate as colorless needles, M.P. 156–157° C.

*Analysis.*—Calcd. for $C_{20}H_{25}FN_4O_2$: C, 64.50; H, 6.77; F, 5.10; N, 15.04. Found: C, 64.64; H, 6.72; F, 5.17; N, 14.80.

EXAMPLE XXVI 2-amino-3-methoxy-N-[2-[4-(p-fluorophenyl)-1-piperazinyl]ethyl]benzamide (A) 1 - (p - fluorophenyl) - 4 - (cyanomethyl) piperazine.—A stirred mixture of 1-(p-fluorophenyl) piperazine (30.6 g., 0.17 mole), chloroacetonitrile (12.9 g., 0.17 mole) and sodium carbonate (18.0 g., 0.17 mole) in isopropanol (90 ml.) was refluxed for 20 hours. The inorganic salt was filtered while hot and the filtrate was cooled to give 31.2 g. (83.9% yield) of tan cubic crystals, M.P. 103–105° C.

(B) 1 - (p - fluorophenyl) - 4 - (2 - aminoethyl) piperazine.—The above nitrile (29.2 g., 0.133 mole) was reduced with lithium aluminum hydride (5.1 g., 0.134 mole) in ether and distilled through a short-path column to give 18.5 g. (62.3% yield) of colorless liquid, B.P. 150–155° C. (0.1 mm.).

(C) 2 - nitro - 3 - methoxy-N-[2-[4-(p-fluorophenyl)-1-piperazinyl]ethyl]benzamide.—A solution of 1-(p-fluorophenyl) - 4 - (2 - aminoethyl)piperazine (9.0 g., 0.040 mole) in benzene (100 ml.) was added dropwise to a stirred solution of 2-nitro-3-methoxybenzoyl chloride (8.6 g., 0.040 mole) in benzene (200 ml.) under a nitrogen atmosphere. The mixture was stirred at ambient temperature for 4 hours and filtered. The filter-cake was recrystallized from a mixture of 30% aqueous sodium hydroxide solution (50 ml.) and hot isopropanol (300 ml.). The hot supernatant isopropanol solution was decanted and cooled to give 14.3 g. (88.8% yield) of yellow needles, M.P. 169–170° C. The analytical sample was recrystallized from ethyl acetate as pale yellow platelets, M.P. 169–170° C.

*Analysis.*—Calcd. for $C_{20}H_{23}FN_4O_4$: C, 59.69; H, 5.76; F, 4.72; N, 13.92. Found: C, 59.83; H, 5.76; F, 4.43; N, 14.15.

(D) 2-amino-3-methoxy-N-[2 - [4 - (p - fluorophenyl)-1-piperazinyl]ethyl]benzamide.—A solution of the above nitrobenzamide (2.0 g., 0.005 mole) in ethyl acetate (250 ml.) was catalytically reduced over Raney nickel (2 g.) under 3 atmospheres of hydrogen. The catalyst was filtered off and the filtrate was cooled to give 1.6 g. (86.5% yield) of colorless platelets, M.P. 164–165° C.

*Analysis.*—Calcd. for $C_{20}H_{25}FN_4O_2$: C, 64.50; H, 6.77; F, 5.10; N, 15.04. Found: C, 64.72; H, 6.88; F, 5.28; N, 14.85.

EXAMPLE XXVII 2-amino-3-methoxy-N-[2-[4-(m-trifluoromethylphenyl)-1-piperazinyl]ethyl]benzamide (A) 1-(m-trifluoromethylphenyl) - 4 - (cyanomethyl) piperazine.—A stirred mixture of 1-(m-trifluoromethylphenyl) piperazine hydrobromide (45.0 g., 0.145 mole), chloroacetonitrile (11.2 g., 0.148 mole), sodium carbonate (45.2 g., 0.426 mole) in isopropanol (90 ml.) was refluxed for 20 hours. The inorganic salts were filtered off while hot and the filtrate was distilled to give 34.4 g. (88.4% yield) of amber liquid, B.P. 152–156° C. (0.01 mm.)

(B) 1 - (m - trifluoromethylphenyl)-4-(2-aminoethyl) piperazine.—The above nitrile (30.0 g., 0.111 mole) was reduced with lithium aluminum hydride (8.6 g., 0.226 mole) in ether and distilled through a short-path column to give 29.2 g. (96.1% yield) of colorless liquid, B.P. 143–146° C. (0.2 mm.).

(C) 2-nitro - 3 - methoxy-N-[2-[4-(m-trifluoromethylphenyl)-1-piperazinyl]ethyl]benzamide.—A solution of 1-(m - trifluoromethylphenyl) - 4 - (2 - aminoethyl) piperazine (8.0 g., 0.029 mole) in benzene (100 ml.) was added dropwise to a stirred solution of 2-nitro-3-methoxybenzoyl chloride (6.3 g., 0.029 mole) in benzene (200 ml.) under a nitrogen atmosphere. The mixture was stirred at ambient temperature for 4 hours and filtered. The filter-cake was dissolved in 10% aqueous sodium hydroxide solution (125 ml.) and the solution was extracted with methylene chloride. After drying over sodium sulfate, the methylene chloride solution was evaporated to dryness under reduced pressure. The residue was recrystallized from a mixture of ethyl acetate and hexane to give 10.2 g. (77.2% yield) of pale yellow needles, M.P. 105–107° C. The analytical sample was recrystallized from ether as off-white needles, M.P. 108–109° C.

*Analysis.*—Calcd. for $C_{21}H_{23}F_3N_4O_4$: C, 55.75; H, 5.12; F, 12.60; N, 12.38. Found: C, 55.92; H, 5.12; F, 12.20; N, 12.54.

(D) 2 - amino - 3 - methoxy-N-[2-[4-(m - trifluoromethylphenyl) - 1 - piperazinyl]ethyl]benzamide.—A solution of the above nitrobenzamide (2.5 g., 0.006 mole) in ethyl acetate (250 ml.) was catalytically reduced over Raney nickel (2.5 g.) under 3 atmospheres of hydrogen. The catalyst was filtered off and the filtrate was cooled to give 2.2 g. (95.6% yield) of colorless platelets, M.P. 148–150° C. The analytical sample was recrystallized from ethyl acetate as colorless platelets, M.P. 149–150° C.

*Analysis.*—Calcd. for $C_{21}H_{25}F_3N_4O_2$: C, 59.70; H, 5.97; F, 13.49; N, 13.26. Found: C, 59.91; H, 5.92; F, 13.45; N, 13.19.

EXAMPLE XXVIII 2-amino-3,4,5-trimethoxy-N-[2-(4-phenyl-1-piperazinyl) ethyl]benzamide (A) 2-nitro - 3,4,5 - trimethoxy-N-[2-(4-phenyl-1-piperazinyl)ethyl]benzamide.—A solution of 1 - phenyl-4-(2-aminoethyl) piperazine (6.0 g., 0.029 mole) in benzene (100 ml.) was added dropwise to a stirred solution of 2-nitro-3,4,5-trimethoxybenzoyl chloride (8.0 g., 0.029 mole) in benzene (200 ml.) under a nitrogen atmosphere. The mixture was stirred for 4 hours at ambient temperature and filtered. The filter-cake was dissolved in 10% aqueous sodium hydroxide solution (125 ml.) and the solution was extracted with methylene chloride. After drying over sodium sulfate, the methylene chloride solution was evaporated to dryness under reduced pressure and the residue was recrystallized from a mixture of ethyl acetate and hexane to give 7.2 g. (55.8% yield) of pale yellow needles, M.P. 110–113° C. The analytical sample was recrystallized from ether as colorless needles, M.P. 113–114° C.

*Analysis.*—Calcd. for $C_{22}H_{28}N_4O_6$: C, 59.45; H, 6.35; N, 12.61. Found: C, 59.52; H, 6.28; N, 12.70.

(B) 2 - amino - 3,4,5 - trimethoxy-N-[2-(4-phenyl-1-piperazinyl)ethyl]benzamide.—A solution of the above nitrobenzamide (3.0 g., 0.007 mole) in ethyl acetate (250 ml.) was catalytically reduced over Raney nickel (3 g.) under 3 atmospheres of hydrogen. The catalyst was filtered off and the filtrate was evaporated to dryness under reduced pressure. The residue was recrystallized from a mixture of ethyl acetate and hexane to give 2.5 g. (89.3% yield) of colorless needles, M.P. 139–140° C.

*Analysis.*—Calcd. for $C_{22}H_{30}N_4O_4$: C, 63.75; H, 7.30; N, 13.52. Found: C, 63.64; H, 7.33; N, 13.61.

EXAMPLE XXIX

2 - amino - 4,5 - methylenedioxy - N - [2 - (4 - phenyl-1-piperazinyl)ethyl]benzamide (A) 2 - nitro - 4,5 - methylenedioxy - N - [2 - (4-phenyl-1-piperazinyl)ethyl]benzamide.—A solution of 1-phenyl-4-(2-aminoethyl) piperazine (8.2 g., 0.04 mole) in benzene (100 ml.) was added dropwise to a stirred solution of 2-nitro-4,5-methylenedioxybenzoyl chloride (9.2 g., 0.04 mole) in benzene (200 ml.) under a nitrogen atmosphere. The mixture was stirred for 3 hours at ambient temperature and filtered. The filter-cake was recrystallized from a hot mixture of 30% aqueous sodium hydroxide (50 ml.) and isopropanol (500 ml.). The hot supernatant isopropanol solution was decanted and cooled to give a tan solid which was recrystallized from a mixture of ethyl acetate and hexane to give 10.1 g. (63.5% yield) of pale yellow needles, M.P. 176–179° C. The analytical sample was recrystallized from ethyl acetate as pale yellow needles, M.P. 179–181° C.

*Analysis.*—Calcd. for $C_{20}H_{22}N_4O_5$: C, 60.29; H, 5.57; N, 14.06. Found: C, 60.52; H, 5.54; N, 14.10.

(B) 2 - amino - 4,5 - methylenedioxy - N - [2 - (4-phenyl-1-piperazinyl)ethyl]benzamide.—A solution of the above nitrobenzamide (2.4 g., 0.006 mole) in ethyl acetate (250 ml.) was catalytically reduced over Raney nickel (2.4 g.) under 3 atmospheres of hydrogen. The catalyst was filtered off and the filtrate was reduced in vacuo to a small volume and cooled to give 1.7 g. (77.3% yield) of colorless platelets, M.P. 178–180° C. The analytical sample was recrystallized from ethyl acetate as colorless platelets, M.P. 179–180° C.

*Analysis.*—Calcd. for $C_{20}H_{24}N_4O_3$: C, 65.20; H, 6.57; N, 15.21. Found: C, 64.95; H, 6.47; N, 14.89.

EXAMPLE XXX 2-carbethoxyamino-4,5-dimethoxy-N-[3-(4-phenyl-1-piperazinyl)propyl]benzamide hydrochloride A solution of 2-amino-4,5-dimethoxy-N-[3-(4-phenyl-1-piperazinyl)propyl]benzamide (5.0 g., 0.0129 mole) in ethyl chloroformate (33 ml., 0.35 mole) was stirred on the steam bath for 3 hours under a nitrogen atmosphere. The resultant suspension was evaporated to dryness under reduced pressure, the residue was triturated with ether and recrystallized from isopropanol to give 6.1 g. (95.3% yield) of colorless needles, M.P. 200–202° C.

Analysis.—Calcd. for $C_{25}H_{35}ClN_4O_5$: C, 59.22; H, 6.96; Cl, 6.99; N, 11.05. Found: C, 59.34; H, 6.95; Cl, 7.12; N, 11.16.

EXAMPLE XXXI 2-dimethylamino-4,5-dimethoxy-N-[3-(4-phenyl-1-piperazinyl)propyl]benzamide trihydrochloride A solution of 2 - amino - 4,5 - dimethoxy - N - [3 - (4-phenyl-1-piperazinyl)propyl]benzamide (1.0 g., 0.0025 mole) and 37% aqueous formaldehyde (5 ml., 0.07 mole) in ethanol (50 ml.), was shaken over 5% palladium-on-carbon (0.5 g.) for 18 hours at ambient temperature under 3 atmospheres of hydrogen. The catalyst was filtered off, the filtrate was evaporated to dryness under reduced pressure and the residue was dissolved in ether. The ether solution was treated with excess hydrogen chloride to give a hygroscopic solid which was recrystallized from a mixture of methol, ethyl acetate and ether to give 0.9 g. (65% yield) of yellow solid, M.P. 178–184° C. The analytical sample was twice recrystallized from a mixture of methanol and ethyl acetate (charcoal) as colorless needles of a hydrate, M.P. 183–187° C.

Analysis.—Calcd. for $C_{24}H_{37}Cl_3N_4O_5 \cdot 2.5H_2O$: C, 49.62; H, 7.29; N, 9.64. Found: C, 49.72; H, 7.38; N, 9.65.

EXAMPLE XXXII

2 - methanesulfonamido - 4,5 - dimethoxy - N - [3 - (4-phenyl-1-piperazinyl)propyl]benzamide A solution of methanesulfonyl chloride (1.0 g., 0.009 mole) in methylene chloride (25 ml.) was added dropwise to a stirred solution of 2-amino-4,5-dimethoxy-N-[3 - (4 - phenyl-1-piperazinyl)propyl]benzamide (2.5 g., 0.0063 mole) in methylene chloride (30 ml.) at ambient temperature. After standing 20 hours at −10° C., the mixture was washed sequentially with 1N hydrochloric acid and 10% aqueous potassium carbonate solution. The methylene chloride solution was dried over potassium carbonate, and evaporated to dryness under reduced pressure. The residue was recrystallized twice from a mixture of ethyl acetate and hexane and finally from isopropanol to give 1.0 g. (33% yield) of colorless needles, M.P. 153.5–155° C.

Analysis.—Calcd. for $C_{23}H_{32}N_4O_5S$: C, 57.96; H, 6.77; N, 11.49; S, 6.73. Found: C, 57.88; H, 6.77; N, 11.52; S, 6.72.

EXAMPLE XXXIII 2-amino-3,6-dimethoxy-N-[3-(4-phenyl-1-piperazinyl)propyl]benzamide (A) 2,5-dimethoxybenzoic acid.—The method used for the preparation of 3,4-diethoxybenzoic acid in Example XVII was applied to the preparation of this compound. The product from methylation of 2,5-dihydroxybenzoic acid (138.7 g., 0.9 mole) with dimethyl sulfate was acidified with hydrochloric acid, recrystallized from water and then isopropanol to give 110.9 g. (68% yield) of colorless needles, M.P. 76–76.5° C.

(B) 2-nitro-3,6-dimethoxybenzoic acid.—Finely powdered 2,5-dimethoxybenzoic acid (16.4 g., 0.09 mole) was added portionwise with stirring to 90% nitric acid (100 ml., 1.6 moles) at −25° C. The temperature was allowed to rise to −15° C. and the suspension was filtered rapidly. The filter-cake was washed with cold water and recrystallized from water (charcoal) and then isopropanol to give 10.0 g. (48.9% yield) of yellow needles, M.P. 193–195° C.

(C) 2-nitro-3,6-dimethoxybenzoyl chloride.—Thionyl chloride (2.38 g., 0.02 mole) was added dropwise to a stirred suspension of the above nitro acid (4.54 g., 0.02 mole) in benzene (35 ml.). A drop of dimethylformamide was added and the resultant solution was refluxed for 10 minutes and then distilled to dryness under reduced pressure to give the crude product.

(D) 2 - nitro - 3,6 - dimethoxy - N - [3 - (4 - phenyl-1-piperazinyl) propyl] benzamide.—1-phenyl-4-3-(aminopropyl) piperazine was added to a stirred suspension of 2-nitro-3,6-dimethoxybenzoyl chloride (4.9 g., 0.02 mole) in chloroform (35 ml.) under a nitrogen atmosphere. The mixture was stirred for 10 minutes at ambient temperature and filtered to give 9.2 g. (99% yield) of the hydrochloride as yellow microcrystals, M.P. 214° C. The hydrochloride was recrystallized from a hot mixture of 30% aqueous sodium hydroxide solution and isopropanol. The hot supernatant isopropanol solution was decanted and cooled to give 5.5 g. (64% yield) of the free base as yellow crystals, M.P. 182.5–184.5° C.

Analysis.—Calcd. for $C_{22}H_{28}N_4O_5$: C, 61.67; H, 6.59; N, 13.08. Found: C, 61.14; H, 6.61; N, 12.76.

(E) 2 - amino - 3,6 - dimethoxy - N - [3 - (4 - phenyl-1-piperazinyl) propyl] benzamide.—A solution of the above nitrobenzamide (0.70 g., 0.0016 mole) in ethyl acetate (200 ml.) was catalytically preduced over Raney Nickel (1 g.) under 3 atmospheres of hydrogen. The catalyst was filtered off and the filtrate was evaporated to dryness under reduced pressure. The residue was recrystallized from ether and then 50% aqueous ethanol to give 0.60 g. (88% yield) of colorless needles, M.P. 82–84° C. The analytical sample was dried over phosphorous pentoxide and analyzed as the monohydrate, M.P. 66–67° C.

Analysis.—Calcd. for $C_{22}H_{32}N_4O_4$: C, 63.44; H, 7.75; N, 13.45. Found: C, 63.40; H, 7.81; N, 13.53.

EXAMPLE XXXIV

The composition of the invention may be combined with pharmaceutically acceptable carriers to produce desired dosage unit forms. For example, 2-amino-4,5-dimethoxy-N-[3-(4-phenyl-1-piperazinyl) propyl] benzamide monohydrochloride may be produced in different dosage unit forms, such as different types of tablets, capsules and injectables.

The following is a tablet formulation which is utilized in situations in which the presence of water is not desirable or may contribute to the instability of the resulting tablet.

| | Mg. |
|---|---|
| 2 - amino - 4,5-dimethoxy - N - [3 - (4 - phenyl-1-piperazinyl) propyl] benzamide monohydrochloride | 30 |
| Lactose | 50 |
| Starch | 85 |
| Ethyl cellulose 5% sol. | 15 |
| Talc | 18 |
| Magnesium stearate | 2 |
| Total | 200 |

The 2-amino-4,5-dimethoxy-N-[3-(4-phenyl - 1 - piperazinyl)propyl] benzamide monohydrochloride is uniformly mixed with lactose and a portion of the starch (25 mg.). The binder, ethyl cellulose, is prepared by making a 5% solution in anhydrous ethyl alcohol. The mixture containing the benzamide is granulated with the ethyl cellulose solution. Anhydrous ethyl alcohol may be added at this stage to obtain satisfactory wet granules. The mixture is wet screened through an appropriate size screen, for example #8 stainless steel screen, and the granulations are dried at room temperature. The mixture is then dry screened through a #20 stainless steel screen. The remaining starch, talc, and magnesium stearate are incorporated by mixing thoroughly with the other ingredients. The mixture is then incorporated in tablets.

This following formulation makes use of a typical "wet granulation" procedure:

| | Mg. |
|---|---|
| 2 - amino - 4,5-dimethoxy - N - [3 - (4 - phenyl-1-piperazinyl)propyl] benzamide monohydrochloride | 30 |
| Starch | 70 |
| Acacia | 10 |
| Lactose | 88 |
| Magnesium stearate | 2 |
| Total | 200 |

The benzamide, part of the starch and part of the acacia are uniformly mixed. A paste is prepared with the remaining portion of the starch and acacia and this paste is employed to granulate the mixture containing the benzamide. The resulting granulate is wet screened through an appropriate size screen and dried at room temperature. It is then dry screened and any remaining starch together with lactose and magnesium stearate are added to the dry granulation. All ingredients are then thoroughly mixed and the resulting mixture is compressed into tablets.

The following formulation utilizes as a granulation procedure, the "pre-compression" or "slugging" method. Such procedure is conducted in the absence of water and non-aqueous liquids. The formulation is as follows:

| | Mg. |
|---|---|
| 2 - amino - 4,5-dimethoxy - N - [3 - (4 - phenyl-1-piperazinyl)propyl] benzamide monohydrochloride | 30 |
| Lactose | 98 |
| Talc | 30 |
| Magnesium stearate | 2 |
| Starch | 40 |
| Total | 200 |

The benzamide, lactose, talc and 50% of the starch are thoroughly mixed. The mixture is compressed into "slugs" using a ¾ inch punch. The compressed "slugs" are oscillated through an appropriate sized screen (either #14 or #16). To the resulting dry granulation the remaining starch together with magnesium stearate is added. The complete granulation is mixed until uniform and the tablets are compressed.

Tabletting when a small percentage of active benzamide is incorporated may be achieved by direct compression. Several methods are available for this purpose. Two methods are illustrated in this example.

One illustration of direct compression is the following formulation:

| | Mg. |
|---|---|
| 2 - amino - 4,5 - dimethoxy - N - [3-(4 - phenyl-1-piperazinyl)propyl]benzamide monohydrochloride | 30 |
| Spray dried lactose | 158 |
| Starch | 10 |
| Magnesium stearate | 2 |
| Total | 200 |

The spray dried lactose, the magnesium stearate and the benzamide are mixed uniformly and then compressed directly into tablets.

Another method of direct compressed tablet involves the utilization of commercially available mixtures such as that sold under the name Emcompress, manufactured by Edward Mendell Co. This mixture has all the necessary ingredients of the tablet, such as the diluent, disintegrant and lubricant added to it. A typical formula of Emcompress is as follows:

| | Parts |
|---|---|
| Dicalcium phosphate, dihydrate | 89.0 |
| Starch USP | 7.5 |
| Magnesium stearate | 1.0 |
| Microcrystalline cellulose | 2.5 |
| | 100.2 |

The benzamide may be incorporated in the Emcompress as in the following formulation:

| | Mg. |
|---|---|
| 2-amino-4,5 - dimethoxy-N-[3-(4-phenyl - 1 - piperazinyl)propyl] benzamide monohydrochloride | 30 |
| Emcompress | 160 |
| Landalgine P–HS | 10 |
| Total | 200 |

Capsules are also a convenient and at times advantageous dosage form. Hard and soft gelatin capsules are used. Usually the active material such as the benzamide is mixed with a suitable quantity of lactose until uniform and the capsules are either filled by hand or by suitable machinery.

One suitable capsule formula is as follows:

| | Mg. |
|---|---|
| 2-amino-4,5 - dimethoxy-N-[3-(4-phenyl - 1 - piperazinyl)propyl] benzamide monohydrochloride | 30 |
| Lactose q.s. to | 300 |

An injectable dosage form may be prepared by dissolving or suspending the benzamide in a suitable vehicle, such as pyrogen free water or an oil base. Such vehicle should meet official governmental specifications.

With water based vehicles, sodium chloride may be added to obtain an isotonic solution. Procaine hydrochloride may be added as a local anesthetic to minimize irritation, and a suitable preservative may be added. Such a preservative may be, for example, benzyl alcohol, methyl and propyl parabens, benzalkonium chloride (1:10,000), phenyl mercuric nitrate (1:50,000) or suitable mixtures of such preservatives.

A typical injectable formulation is:

| | |
|---|---|
| 2-amino-4,5-dimethoxy-N-[3-(4 - phenyl - 1 - piperazinyl)propyl]benzamide monohydrochloride _mg__ | 30 |
| Procaine hydrochloride _____mg__ | 10 |
| Sodium chloride for isotonicity | q.s. |
| Benzalkonium chloride | 1:10,000 |
| Water for injection q.s. to _____mL__ | 1.0 |

To prepare such injectables, procaine hydrochloride, benzalkonium chloride, sufficient sodium chloride to obtain isotonicity and finally the benzamide are added together. The product is manufactured under sterile conditions, filtered and filled into suitable containers, either single dose ampules or multi-dose vials.

What is claimed is:

1. A composition of matter selected from the class consisting of basically substituted alkoxy anthranilamides, their corresponding 2-nitro compounds, and non-toxic acid addition salts of all such compounds, said basically substituted alkoxy anthranilamides having the formula:

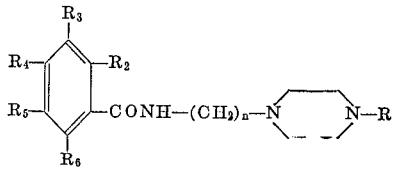

in which R is lower alkyl, phenyl or substituted phenyl in which the substituent is halogen, lower alkyl, lower alkoxy or trifluoromethyl, $R_2$ is nitro or amino; $R_3$, $R_4$, $R_5$ and $R_6$ is hydrogen or lower alkoxy or methylenedioxy group, at least one of $R_3$, $R_4$, $R_5$ or $R_6$ being a lower alkoxy or connected to a methylenedioxy group; and $n$ is a whole number within the range of 2 through 4.

2. A composition of matter in accordance with claim 1, in which the compound is 2-amino-4,5-dimethoxy-N-[3-(4-phenyl-1-piperazinyl) propyl] benzamide or the non-toxic addition salts thereof.

3. A composition of matter in accordance with claim 1 in which the compound is 2-amino-4,5-dimethoxy-N-[4-(4-phenyl-1-piperazinyl) butyl] benzamide or the non-toxic addition salts thereof.

4. A composition of matter in accordance with claim 1 in which the compound is 2-amino-4,5-dimethoxy-N-[3-[4-(o-tolyl)- 1-piperazinyl] propyl] benzamide or the non-toxic addition salts thereof.

5. A composition of matter in accordance with claim 1 in which the compound is 2-amino-4,5-dimethoxy-N-[3-[4-(m-tolyl)-1-piperazinyl] propyl] benzamide or the non-toxic addition salts thereof.

6. A composition of matter in accordance with claim 1 in which the compound is 2-amino-4,5-dimethoxy-N-[3-[4-(p-methoxyphenyl)-1-piperazinyl] propyl] benzamide or the non-toxic addition salts thereof.

7. A composition of matter in accordance with claim 1 in which the compound is 2-amino-4,5-dimethoxy-N-[2-[4-(m-chlorophenyl)-1-piperazinyl] ethyl] benzamide or the non-toxic addition salts thereof.

8. A composition of matter in accordance with claim 1 in which the compound is 2-amino-4,5-dimethoxy-N-[3-[4-(o-chlorophenyl)-1-piperazinyl] propyl] benzamide or the non-toxic addition salts thereof.

9. A composition of matter in accordance with claim 1 in which the compound is 2-amino-4,5-dimethoxy-N-[3-[4-(m-chlorophenyl)-1-piperazinyl] propyl] benzamide or the non-toxic addition salts thereof.

10. A composition of matter in accordance with claim 1 in which the compound is 2-amino-4,5-dimethoxy-N-[3-[4-(p-chlorophenyl)-1-piperazindyl] propyl] benzamide or the non-toxic addition salts thereof.

11. A composition of matter in accordance with claim 1 in which the compound is 2-amino-3-methoxy-N-[2-(4-phenyl-1-piperazinyl) ethy] benzamide or the non-toxic addition salts thereof.

12. A composition of matter in accordance with claim 1 in which the compound is 2-amino-3-methoxy-N-[3-(4-phenyl-1-piperazinyl) propyl] benzamide or the non-toxic addition salts thereof.

13. A composition of matter in accordance with claim 1 in which the compound is 2-amino-3-methoxy-N-[4-(4-phenyl-1-piperazinyl) butyl] benzamide or the non-toxic addition salts thereof.

14. A composition of matter in accordance with claim 1 in which the compound is 2-amino-4,5-methylenedioxy-N-[3-(4-phenyl-1-piperazinyl) propyl] benzamide or the nontoxic addition salts thereof.

15. A composition of matter in accordance with claim 1 in which the compound is 2-amino-4,5-methylenedioxy-N-[4-(4-phenyl-1-piperazinyl) butyl] benzamide or the non-toxic addition salts thereof.

16. A composition of matter in accordance with claim 1 in which the compound is 2-amino-3,4,5-trimethoxy-N-[3 - (4-phenyl-1-piperazinyl) propyl] benzamide or the non-toxic addition salts thereof.

17. A composition of matter in accordance with claim 1 in which the compound is 2-amino-4,5-diethoxy-N-[3-(4-phenyl-1-piperazinyl) propyl] benzamide or the non-toxic addition salts thereof.

18. A composition of matter in accordance with claim 1 in which the compound is 2-acetylamino-4,5-dimethoxy-N - [3-(4-phenyl-1-piperazinyl] benzamide or the non-toxic addition salts thereof.

19. A composition of matter in accordance with claim 1 in which the compound is 2-amino-4,5-dimethoxy-N-[3-(4-methyl-1-piperazinyl) propyl] benzamide or the non-toxic addition salts thereof.

20. A composition of matter in accordance with claim 1 in which the compound is 2-amino-4,5-dimethoxy-N-[3-[4-(o-fluorophenyl)-1-piperazinyl] propyl] benzamide or the non-toxic addition salts thereof.

21. A composition of matter in accordance with claim 1 in which the compound is 2-amino-4,5-dimethoxy-N-[3-[4-(m-fluorophenyl)-1-piperazinyl] propyl] benzamide or the non-toxic addition salts thereof.

22. A composition of matter in accordance with claim 1 in which the compound is 2-amino-4,5-dimethoxy-N-[3-[4-(p-fluorophenyl)-1-piperazinyl] propyl] benzamide or the non-toxic addition salts thereof.

23. A composition of matter in accordance with claim 1 in which the compound is 2-amino-4,5-dimethoxy-N-[3-[4-(m-trifluoromethylphenyl)-1 - piperazinyl] propyl] benzamide or the non-toxic addition salts thereof.

24. A composition of matter in accordance with claim 1 in which the compound is 2-amino-3-methoxy-N-[2-[4-(o-fluorophenyl)-1-piperazinyl] ethyl] benzamide or the non-toxic addition salts thereof.

25. A composition of matter in accordance with claim 1 in which the compound is 2-amino-3-methoxy-N-[2-[4-(m-fluorophenyl)-1-piperazinyl] ethyl] benzamide or the non-toxic addition salts thereof.

26. A composition of matter in accordance with claim 1 in which the compound is 2-amino-3-methoxy-N-[2-[4-(p-fluorophenyl)-1-piperazinyl] ethyl] benzamide or the non-toxic addition salts thereof.

27. A composition of matter in accordance with claim 1 in which the compound is 2-amino-3-methoxy-N-[2-[4-(m-trifluoromethylphenyl)-1-piperazinyl] ethyl] benzamide or the non-toxic addition salts thereof.

28. A composition of matter in accordance with claim 1 in which the compound is 2-amino-3,4,5-trimethoxy-N-[2-(4-phenyl-1-piperazinyl) ethyl] benzamide or the non-toxic addition salts thereof.

29. A composition of matter in accordance with claim 1 in which the compound is 2-amino-4,5-methylenedioxy-N-[2-(4-phenyl-1-piperazinyl) ethyl] benzamide or the non-toxic addition salts thereof.

30. A composition of matter in accordance with claim 1 in which the compound is 2-dimethylamino-4,5-dimethoxy-N-[3-(4-phenyl-1-piperazinyl) propyl] benzamide or the non-toxic addition salts thereof.

31. A composition of matter in accordance with claim 1 in which the compound is 2-amino-3,6-dimethoxy-N-[3-(4-phenyl-1-piperazinyl) propyl] benzamide or the non-toxic addition salts thereof.

32. A composition of matter in accordance with claim 1 in which the compound is 2-amino-4,5-dimethoxy-N-[2-(4-phenyl-1-piperazinyl) ethyl] benzamide or the non-toxic addition salts thereof.

References Cited

UNITED STATES PATENTS 3,005,821  10/1961  Hayao _____ 260—268

ALEX MAZEL, Primary Examiner

A. M. TIGHE, Assistant Examiner

U.S. Cl. X.R.

260—340.5, 521, 544; 424—250